US009652121B2

(12) United States Patent
McKenzie et al.

(10) Patent No.: US 9,652,121 B2
(45) Date of Patent: May 16, 2017

(54) ADAPTIVELY NAVIGATING COMPLEXITY TOGETHER THROUGH COLLABORATIVE INSIGHTS

(71) Applicant: Future Insight Maps, Inc., Fair Oaks, CA (US)

(72) Inventors: Bruce McKenzie, Vincentia (AU); Jane Lorand, Fair Oaks, CA (US); Jason Skinner, Folsom, CA (US)

(73) Assignee: Future Insight Maps, Inc., Fair Oaks, CA (US)

( * ) Notice: Subject to any disclaimer, the term of this patent is extended or adjusted under 35 U.S.C. 154(b) by 293 days.

(21) Appl. No.: 14/327,832

(22) Filed: Jul. 10, 2014

(65) Prior Publication Data

US 2015/0020002 A1   Jan. 15, 2015

Related U.S. Application Data

(60) Provisional application No. 61/845,608, filed on Jul. 12, 2013.

(51) Int. Cl.
*G06F 3/0482* (2013.01)
*G06Q 10/10* (2012.01)
(Continued)

(52) U.S. Cl.
CPC .......... *G06F 3/0482* (2013.01); *G06Q 10/10* (2013.01); *G06Q 10/101* (2013.01); *H04L 12/1822* (2013.01); *H04L 65/403* (2013.01)

(58) Field of Classification Search
None
See application file for complete search history.

(56) References Cited

U.S. PATENT DOCUMENTS 7,133,845 B1   11/2006   Ginter et al.
7,580,848 B2   8/2009   Eder
(Continued)

FOREIGN PATENT DOCUMENTS

WO   WO 2011/038361 A1   3/2011
WO   WO 2015/006661 A1   1/2015

OTHER PUBLICATIONS

International Preliminary Report on Patentability for International PCT Patent Application No. PCT/US10/50433, mailed Apr. 12, 2012, 8 pages. The International Bureau of WIPO, Geneva, Switzerland.
(Continued)

*Primary Examiner* — Jeffrey A Gaffin
*Assistant Examiner* — John M Heffington
(74) *Attorney, Agent, or Firm* — Rutan & Tucker, LLP

(57) ABSTRACT

Methods and Apparatuses for a collaborative effort from a group of participants on an issue-exploration process on one or more client machines are discussed. A form-based Internet application that consists of a systematic structure of a series of tab forms to set up a framework for a collaborative effort from a group of participants on an issue-exploration process is configured for an initial issue. The form-based Internet application via the series of tab forms is configured to enable and collect knowledge and insights from the group of participants during the stages of the issue-exploration process. The form-based Internet application has an open framework with the stages of the issue-exploration process in that an actual content of the ideas contributed by participants actively shapes a non-linear progression of the issue-exploration process from the initial issue to the current issue in the issue-exploration process.

20 Claims, 18 Drawing Sheets

(51) Int. Cl.
    *H04L 12/18*     (2006.01)
    *H04L 29/06*     (2006.01)

(56) References Cited

U.S. PATENT DOCUMENTS

| | | | |
|---|---|---|---|
| 2001/0053993 A1 | 12/2001 | McMean et al. | |
| 2004/0153128 A1 | 8/2004 | Suresh et al. | |
| 2005/0010510 A1 | 1/2005 | Brose et al. | |
| 2005/0096950 A1 | 5/2005 | Caplan et al. | |
| 2007/0011071 A1 | 1/2007 | Cuscovitch et al. | |
| 2007/0294128 A1 | 12/2007 | Wedemeyer | |
| 2008/0040137 A1* | 2/2008 | Lee | G06Q 10/10 705/309 |
| 2009/0157465 A1 | 6/2009 | Heathfield | |
| 2009/0199104 A1 | 8/2009 | Pluschkell et al. | |
| 2011/0126128 A1 | 5/2011 | McKenzie et al. | |
| 2013/0298041 A1* | 11/2013 | Lang | H04L 65/403 715/753 |
| 2015/0229698 A1* | 8/2015 | Swan | G06Q 10/101 709/203 |

OTHER PUBLICATIONS

International Search Report and Written Opinion for International Patent Application No. PCT/US2010/050433, mailed Nov. 23, 2010, 9 pages. International Searching Authority, Alexandria, Virginia, USA.

McKenzie, Bruce, et al. Reference Notes for "Systemic Thinking Module", GreenMBA, Dominican University of California, Aug. 2009, 89 pages.

Workshop 3 Workbook "Strategic Leadership Development Program", The Systemic Development Institute, 2005, 168 pages.

Rasmus, Daniel W., "Scenario Planning and the Future of Education", Microsoft Higher Education White Papers, Jun. 23, 2011, pp. 1-4.

Part 11: Wireless LAN Medium Access Control (MAC) and Physical Layer (PHY) Specifications: Higher-Speed Physical Layer Extension in the 2.4 GHz Band, IEEE Std. 802.11b-1999, 96 pages.

Restriction Requirement for U.S. Appl. No. 12/890,523 mailed Jun. 21, 2013, 7 pages. U.S. Patent and Trademark Office, Alexandria, Virginia, USA.

Non-Final Office Action for U.S. Appl. No. 12/890,523 mailed Sep. 17, 2014, 52 pages.

Non-Final Office Action for U.S. Appl. No. 12/890,523 mailed Nov. 15, 2013, 58 pages.

International Search Report and Written Opinion for International Patent Application No. PCT/US2014/046300, mailed Oct. 27, 2014, 16 pages. International Searching Authority, Alexandria, Virginia, USA.

\* cited by examiner

Admin

WINDTUNNELING               Edit Text  Dashboard  Sign Out

Generating Ideas — 10 — Assessing Ideas — 14 — Integrating Ideas — Emerging Insights Across — Emerging Insights Down Facilitator Dashboard | Overview | Create Project | Manage Project | Manage Participants

Facilitator Dashboard

12 →

| 100 | Records per Page | | | | | Search | | | |
|---|---|---|---|---|---|---|---|---|---|
| # | Name | Description | Template | Stage | Created Date | | | | |
| 1 | Project 1 | Project desc. | Full Mode | Open Flow | Apr. 3 2014 | Delete | Facilitate | | |
| 2 | Project 2 | Project desc. | Full Mode | Open Flow | Apr. 3 2014 | Delete | Facilitate | | |
| 3 | Project 3 | Project desc. | Full Mode | Open Flow | Apr. 3 2014 | Delete | Facilitate | | |
| 4 | Project 4 | Project desc. | Full Mode | Open Flow | Apr. 3 2014 | Delete | Facilitate | | |
| 5 | Project 5 | Project desc. | Full Mode | Open Flow | Apr. 3 2014 | Delete | Facilitate | | |
| 6 | Project 6 | Project desc. | Full Mode | Open Flow | Apr. 3 2014 | Delete | Facilitate | | |

Showing 1 to 6 of 6 entries                                    < Previous  1  Next >

Facilitating for: Project 1 | Transparency and Anonymity Analytical Report

Facilitating for: Project 1 | Transparency and Anonymity Analytical Report

Figure 1

| Admin | WINDTUNNELING | Edit Text  Dashboard  Sign Out |
|---|---|---|
| | Generating Ideas · Assessing Ideas · Integrating Ideas · Emerging Insights Across · Emerging Insights Down | |

Facilitator Dashboard | Overview | Create Project | Manage Project | Manage Participants

GET STARTED:
Project Set-up

What is the Facilitator asked to do during Project Set-up?

The Facilitator's task is 1) to make decisions about the design of their WindTunnel and 2) to implement that design.

1 Familiarizing

During "Project Set-up," the Facilitation Team (we encourage a team approach) prepares itself to begin their project by familiarizing themselves with the WindTunneling process.

Read More

2 Organizing

The Facilitators organize their Team and work with the Project Sponsors (those in the organization who have brought in or requested WindTunneling) to clarify the purpose of the Facilitating for: Project 1 | Transparency and Anonymity        Figure 2        Analytical Report

WINDTUNNELING

Admin  Generating ideas  Assessing Ideas  Integrating Ideas  Edit Text  Dashboard  Sign Out Facilitator Dashboard | Overview | Create Project | Manage Project | Emerging Insights Across | Manage Participants | Emerging Insights Down Select Customer  ▶

Choose Template  ▶

Project Name

Description

Temporary Username

Temporary Password

Submit

Facilitating for: Project 1 | Transparency and Anonymity          Figure 3          Analytical Report

Figure 4

WINDTUNNELING

Admin | Edit Text   Dashboard   Sign Out

Generating Ideas | Assessing Ideas | Integrating Ideas | Emerging Insights Across | Emerging Insights Down Facilitator Dashboard | Overview | Create Project | Manage Project | Manage Participants

Select Project: [▼]

Participant Email Address: [ ]

Participant Username: [ ]

Participant 1, Participant1@email.com
Participant 2, Participant2@email.com

Allow Read Only: ☐

Is Facilitator: ☐

(Remove Selected Participant)

Upload User .csv File: (Browse)   No File Currently Selected.

(Submit)

Facilitating for: Project 1 | Transparency and Anonymity    Figure 5    Analytical Report

| Admin | WINDTUNNELING | Edit Text  Dashboard  Sign Out |
|---|---|---|
| Generating Ideas ← 14 | Assessing Ideas \| Integrating Ideas \| Emerging Insights Across | Emerging Insights Down |

Overview | Contribute | See Outcomes

| ID ▲ | Category | Ideas |
|---|---|---|
| 2173 | Round B - In- flight experience | Clean the AIR and Let us Breathe<br>The quality of the cabin air is nasty...I can feel it and yet there is so little I can do to protect myself. We are so tightly packed together that it is a deterrent to flying. I take prevention pills, etc. but even with a mask, it is oppressive. I believe that investing in research and implementing different approaches would set an airline at a BIG competitive edge...and you advertise "CLEANER AIR" and leads to healthier trips...no one wants to get to a vacation arrival place with a cold or days of recovery time. |
| 2174 | Round B - In- flight experience | Can we get CALM together?<br>What if at the beginning of a flight, the attendant led us in a short meditation. What if the video were about how to "connect" with your neighbor in a socially appropriate way? What if we got little stickers that "said" we wanted to not socialize on this flight? Social cues and a collective chance to "chill" or calm ourselves down might work wonders. No flight I've ever been on shows that much insight into social dynamics, programmed awkwardness, and a better way. |
| 2251 | Round B - Arrival at Airport to Take Off | Title<br><br>Description |

Facilitating for: Project 1 | Transparency and Anonymity     Figure 6     Analytical Report

WINDTUNNELING

| Admin | Generating Ideas | Assessing Ideas | Integrating Ideas | Emerging Insights Across | Emerging Insights Down | Dashboard | Sign Out |

Overview | Contribute | See Outcomes

See Outcomes

[100 ▼] Records per Page          Search [____]

| Category | ID | IDEAS |
|---|---|---|
| Airline Staff | 247 | Fire on the plane<br>We need to have staff who are fully trained on fire regulation. Is this happening. |
| Airport Staff | 248 | Security screening machine is found to be faulty<br>An analysis of security screens at airports has been found to be faulty. Research completed by independent body 'Flying Explosives' found that machines are failing to pick up potentially dangerous objects including aerosol cans and chemicals that may be used as explosives. |
| Industry Regulators | 246 | No hot drinks in the cockpit policy<br>Imagine: a hot cup of cocoa falls on the pilot's lap |

Facilitating for: Project 1 | Transparency and Anonymity
See All Outcomes

*Participants remain anonymous from other participants throughout the interface.*

*IDs are given to individual ideas as a reference for others and cannot be reverse attributed to any individual participant.*

Figure 7

| Admin | Generating Ideas | Assessing Ideas 16 | Integrating Ideas | Emerging Insights Across | Emerging Insights Down |
|---|---|---|---|---|---|

| Overview | Contribute | See Outcomes |
|---|---|---|

| Category | ID ▲ | Designated Idea Headlines Edit | Edit Impact Average | Edit Standard Deviation for Impact | Edit Impact-2 Average for Probability | Edit Standard Deviation for Impact-2 | Edit Non-Ratings |
|---|---|---|---|---|---|---|---|
| Round B - In-flight experience | 2173 | Clean the AIR and Let us Breathe The quality of the cabin air is nasty...I can feel it and yet there is so little I can do to protect myself. We are so tightly packed together that it is a deterrent to flying. I take prevention pills, etc. but even with a mask, it is oppressive. I believe that investing in research and implementing different approaches would set an airline at a BIG competitive edge...and you advertise "CLEANER AIR" and leads to healthier trips...no one wants to get to a vacation arrival place with a cold or days of recovery time. | 7.67 | 1.63 | 7.33 | 1.75 | 0 |
| Round B - In-flight experience | 2174 | Can we get CALM together? What if at the beginning of a flight, the attendant led us in a short meditation. What if the video were about how to "connect" with your neighbor in a socially appropriate way? What if we got little stickers that "said" we wanted to not socialize on this flight? Social cues and a collective chance to "chill" or calm ourselves down might work wonders. No flight I've ever been on shows that much insight into social dynamics, programmed awkwardness, and a better way. | 4.80 | 3.56 | 4.00 | 2.35 | 0 |

Facilitating for: Project 1 | Transparency and Anonymity     Analytical Report

Figure 8

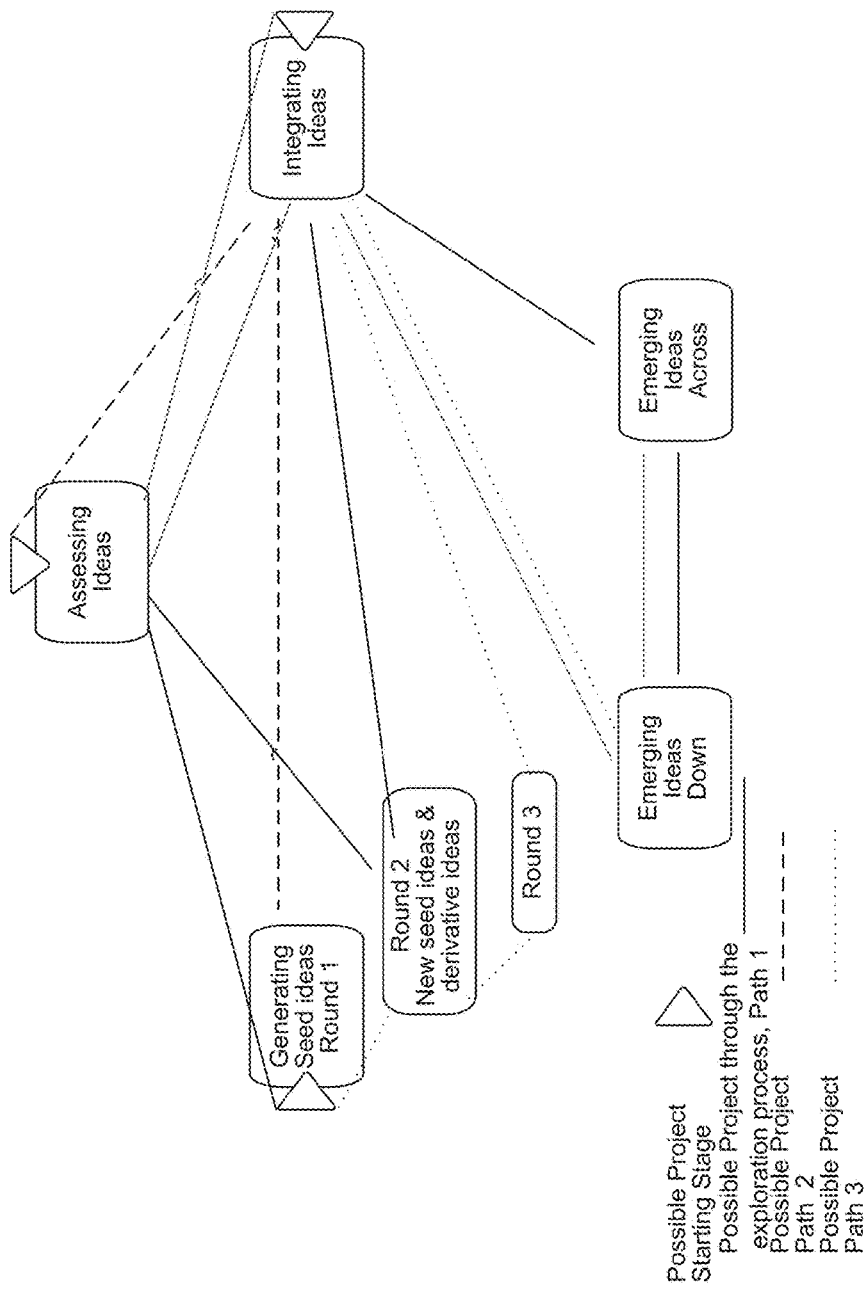

ADAPTIVELY NAVIGATING COMPLEXITY TOGETHER THROUGH COLLABORATIVE INSIGHTS

RELATED APPLICATIONS

This application claims the benefit of and priority to U.S. Provisional Application titled "Wind Tunneling: Transforming Individuals' Ideas Into Collaborative Insights" filed on Jul. 12, 2013 having application Ser. No. 61/845,608, and is herein incorporated by reference.

NOTICE OF COPYRIGHT

A portion of the disclosure of this patent document contains material that is subject to copyright protection. The copyright owner has no objection to the facsimile reproduction by anyone of the software engine and its modules, as it appears in the Patent and Trademark Office Patent file or records, but otherwise reserves all copyright rights whatsoever.

FIELD OF THE INVENTION

Embodiments of the invention generally relate to non-linear, participant-informed, group collaboration for effective navigation of complex issues (both present and future) facing organizations utilizing unique systemic methods and principles, such as diversity, transparency and anonymity.

BACKGROUND

Strategic thinking is generally relegated to higher managers and executives. However, with increasingly complex issues facing the organizations, more "human power" and diverse, relevant information is needed. Conventional hierarchy blocks the flow of communication "upstream" as well as among contributors from all levels and departments. Current decision-makers are under pressure from complexity: principled practices that quickly enable the on-going, open flow of ideas helps them share the pressure across the organization.

BRIEF DESCRIPTION OF THE DRAWINGS

The multiple drawings refer to the embodiments of the invention.

FIGS. 1-5 illustrate an embodiment of a form-based Internet application that consists of a systematic structure of a series of tab forms to set up a non-linear framework for a collaborative effort from a group of participants on an issue-exploration process.

FIG. 6 illustrates an embodiment of the "Generating Ideas" tab form that gives the participants a "blank slate box" to share whatever perspectives or knowledge that they believe to be relevant and significant to the current issue being explored without presenting the participants a fixed list of options to provide their input on.

FIG. 7 illustrates an embodiment of the "Generate Ideas" tab form, which allows idea to be submitted anonymously.

FIG. 8 illustrates an embodiment of the Assess and Assign ratings to the Idea tab form, which is coded to both i) present a set of contributed ideas to be displayed on their client machine to all of the participants and ii) present a mechanism on their client machine for each participant to quantitatively assess both 1) an impact of the idea and 2) a probability that the idea may occur or be implemented, for each of the contributed ideas.

FIGS. 9 & 10 illustrate an embodiment of the series of tab forms that are coded in order to facilitate an iterative process in different rounds of a same stage of the issue-exploration process, where one or more of the stages of the issue-exploration process can be repeated, in a subsequent round of the stage in the issue-exploration process, based on reviewing the knowledge and insights contributed by the participants in an earlier round of that stage.

Figure 10:
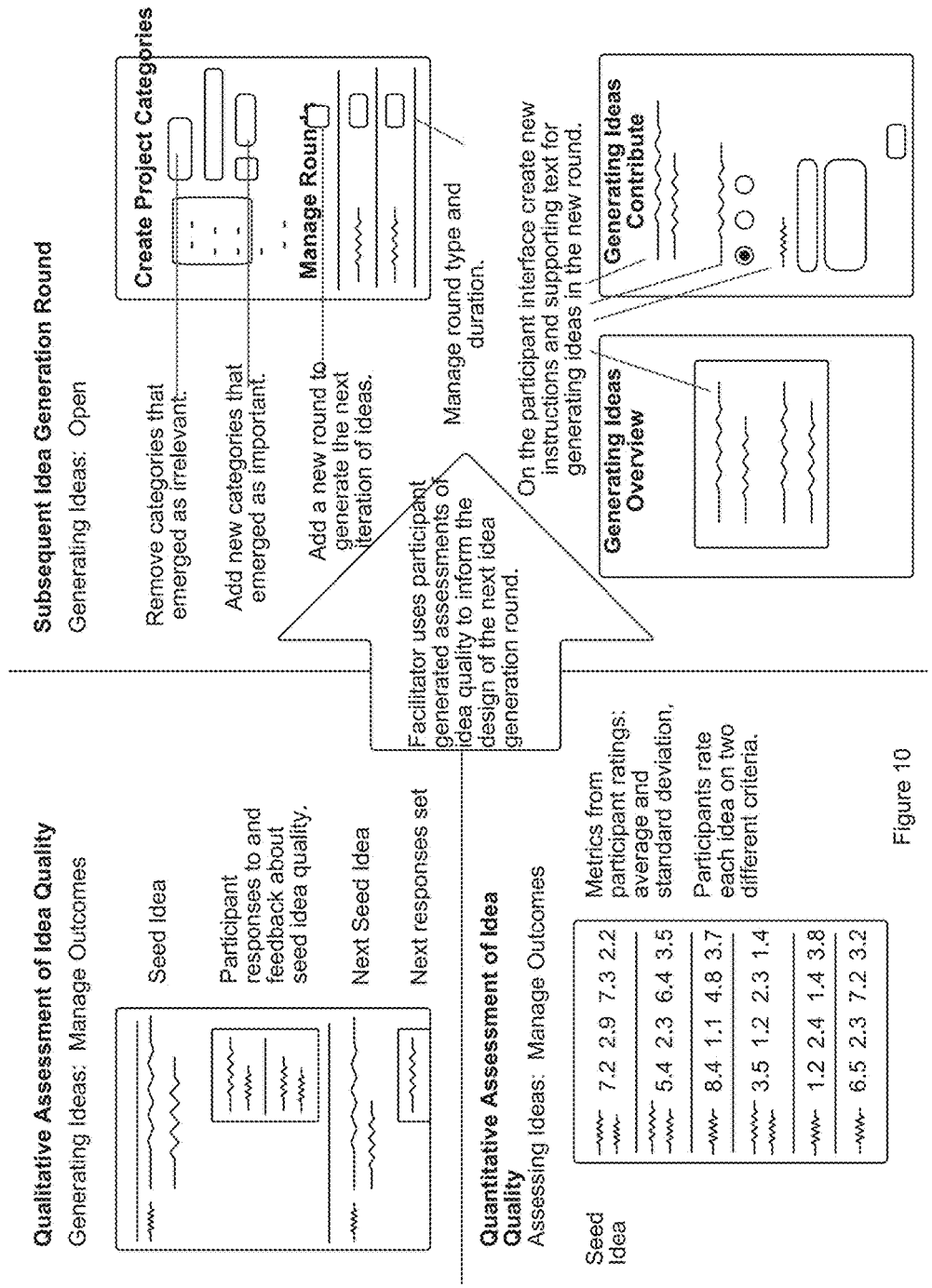

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention.

SUMMARY OF THE INVENTION

In an embodiment, a method for a collaborative effort from a group of participants on an issue-exploration process on one or more client machines is discussed.

A form-based Internet application that consists of a systematic structure of a series of tab forms to set up a framework for a collaborative effort from a group of participants using one or more client machines on an issue-exploration process is configured for an initial issue. The participants typically use two or more client machines. Each stage in the issue-exploration process is represented by a different tab form presented in a user interface of the application. The series of tab forms are configured to allow the group of participants to engage with-stages of the non-linear issue-exploration process including generating ideas relevant towards a current issue, assess and assign ratings to ideas regarding the current issue, integrate the ideas amongst other ideas, and emerge any insights from the integration of the ideas. Two or more of the tab forms have a series of menu options with pursuit-based functionality on that form that can be performed under that tab to perform that pursuit.

The form-based Internet application via the series of tab forms is configured to enable and collect knowledge and insights from the group of participants during the stages of the issue-exploration process. The client machines have i) browser software to access the form-based Internet application over a network, ii) a resident instance of the form-based Internet application on a first client machine configured to communicate with 1) other instances of the form-based Internet application on the different client machines or 2) a server based back end system over the network, and iii) any combination of both to allow the participants to be able to share and compare their knowledge and insights about a current issue in the issue-exploration process.

Results from the knowledge and insights of the participant users are collected, and are then presented to all the participants by the form-based Internet application on their client machine. The form-based Internet application has an open framework with the stages of the issue-exploration process, where the actual content of the ideas contributed by participants actively shapes progression of the issue-exploration process from the initial issue to the current issue in the issue-exploration process.

The knowledge and insights contributed by the participants as well as any plan of action are stored in a database. The form-based Internet application can be implemented as software code, hardware logic circuits, and any combination of the two, and portions of the form-based Internet application scripted in software code are stored in a non-transitory computing device readable medium in an executable format.

DETAILED DISCUSSION

In the following description, numerous specific details are set forth, such as examples of specific routines, named components, connections, tools, etc., in order to provide a thorough understanding of the present invention. It will be apparent, however, to one skilled in the art that the present invention may be practiced without these specific details. In other instances, well known components or methods have not been described in detail but rather in a block diagram in order to avoid unnecessarily obscuring the present invention. Thus, the specific details set forth are merely exemplary. The specific details may be varied from and still be contemplated to be within the spirit and scope of the present invention. Characteristics discussed in relationship to one embodiment may be, where logically possible, implemented in another embodiment.

Overview

For some example embodiments, methods and apparatuses for a collaborative effort from a group of participants on an issue-exploration process on one or more client machines is discussed. A form-based Internet application that consists of a systematic structure of a series of tab forms to set up a framework for a collaborative effort from a group of participants on an issue-exploration process is configured for an initial issue. The form-based Internet application via the series of tab forms is configured to enable and collect knowledge and insights from the group of participants during the stages of the issue-exploration process. The form-based Internet application has an open framework with the stages of the issue-exploration process in that an actual content of the ideas contributed by participants actively shapes progression of the issue-exploration process from the initial issue to the current issue in the issue-exploration process.

Figure 17:
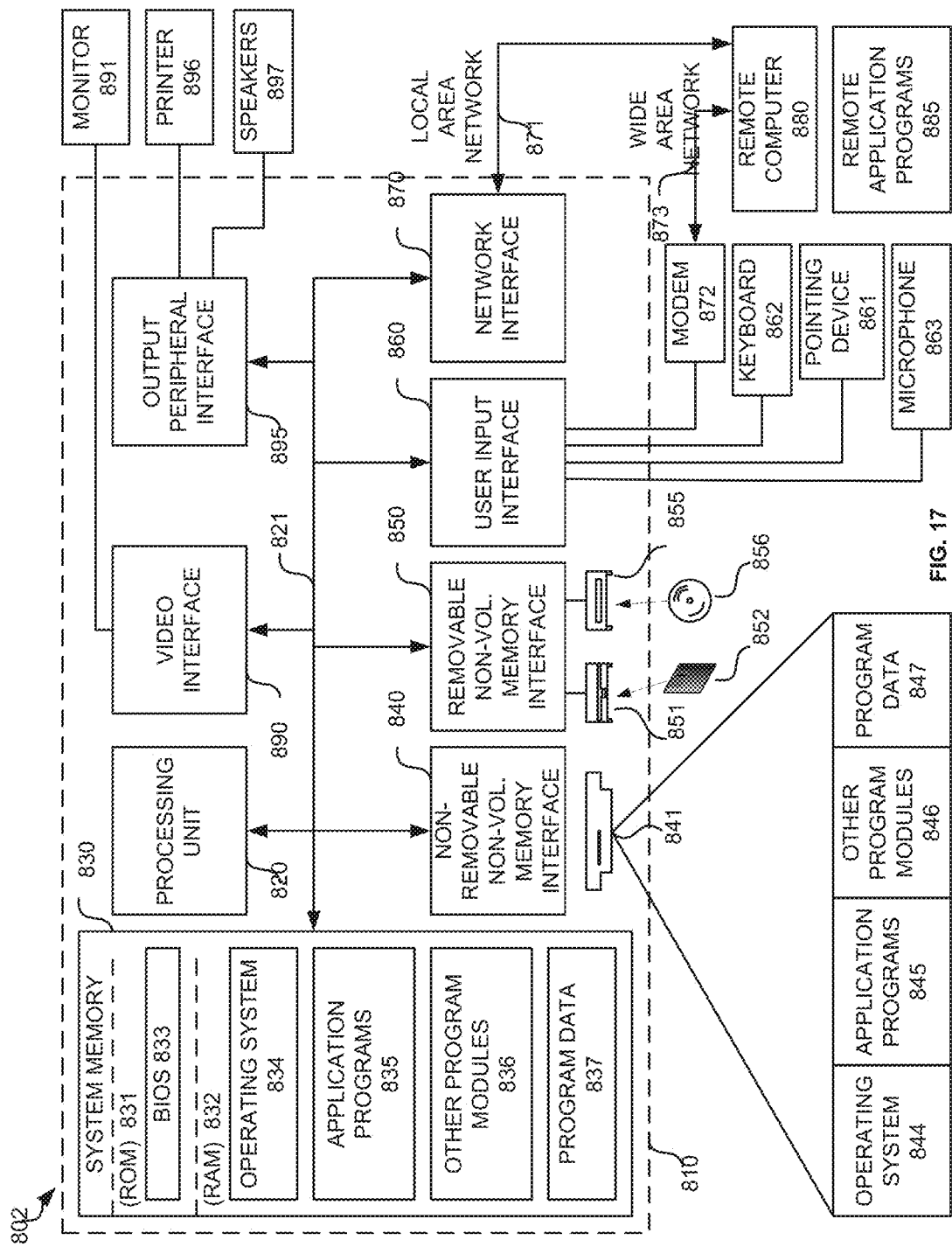
FIG. 17 illustrates a block diagram of an example computing system, including a mobile computing device, that may use an embodiment of one or more of the software applications discussed herein.
Figure 18:
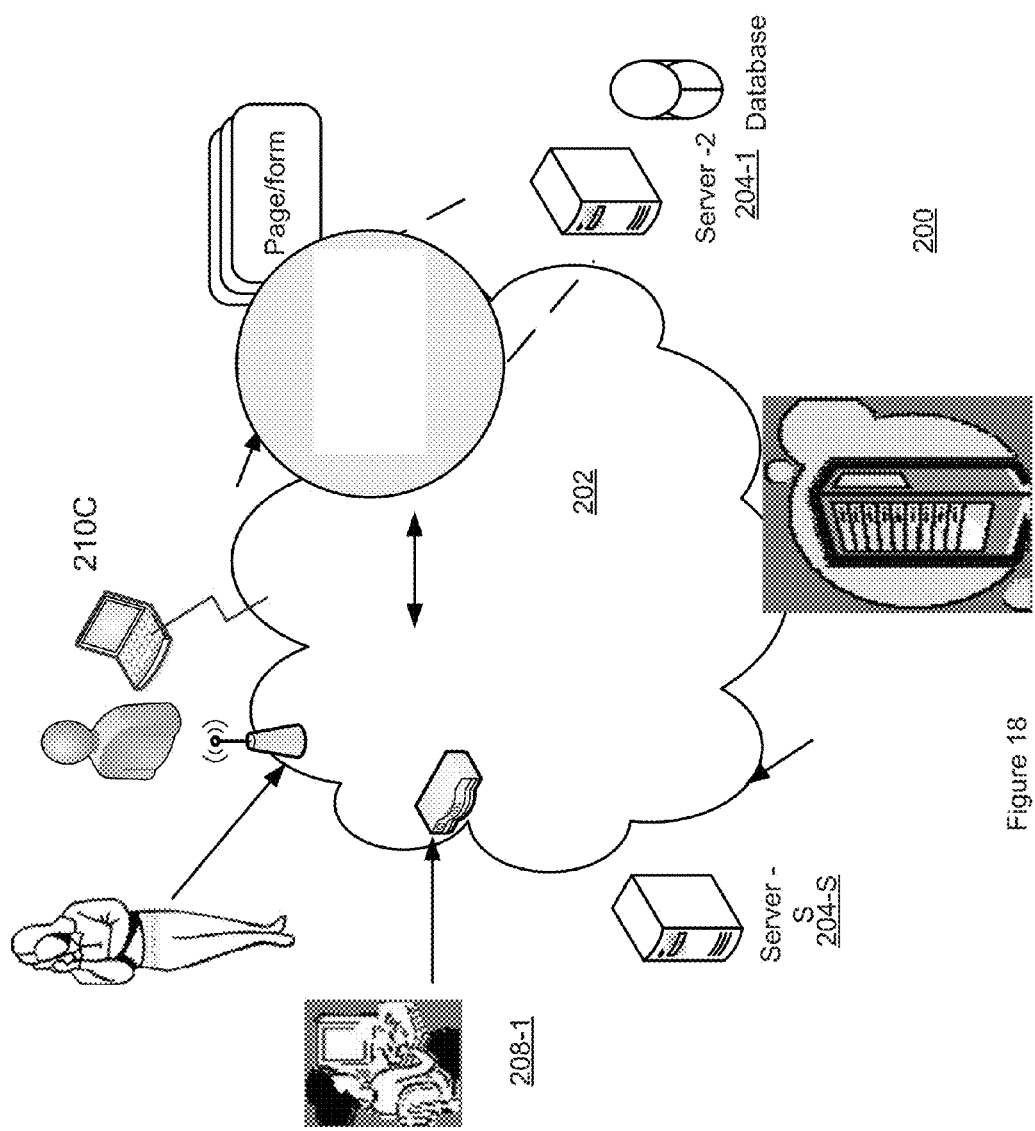
FIG. 18 illustrates a diagram of a network environment in which the techniques described herein may be applied.

The form-based Internet application may reside in a stand-alone computer system, or they may be configured as web applications hosted by one or more server computers connected to a network, as described in FIG. 17 and FIG. 18. The issue-exploration process may be a non-linear, participant-informed, iterative process embodied within this technology.

When the form-based Internet application is implemented as web-based applications, the participants may use client computers and browser software to access the network, get connected to the server computers, and be able to provide their knowledge and insights. For some embodiments, the applications may reside and execute partially on a client computer and partially hosted on a server computer.

Figure 4:
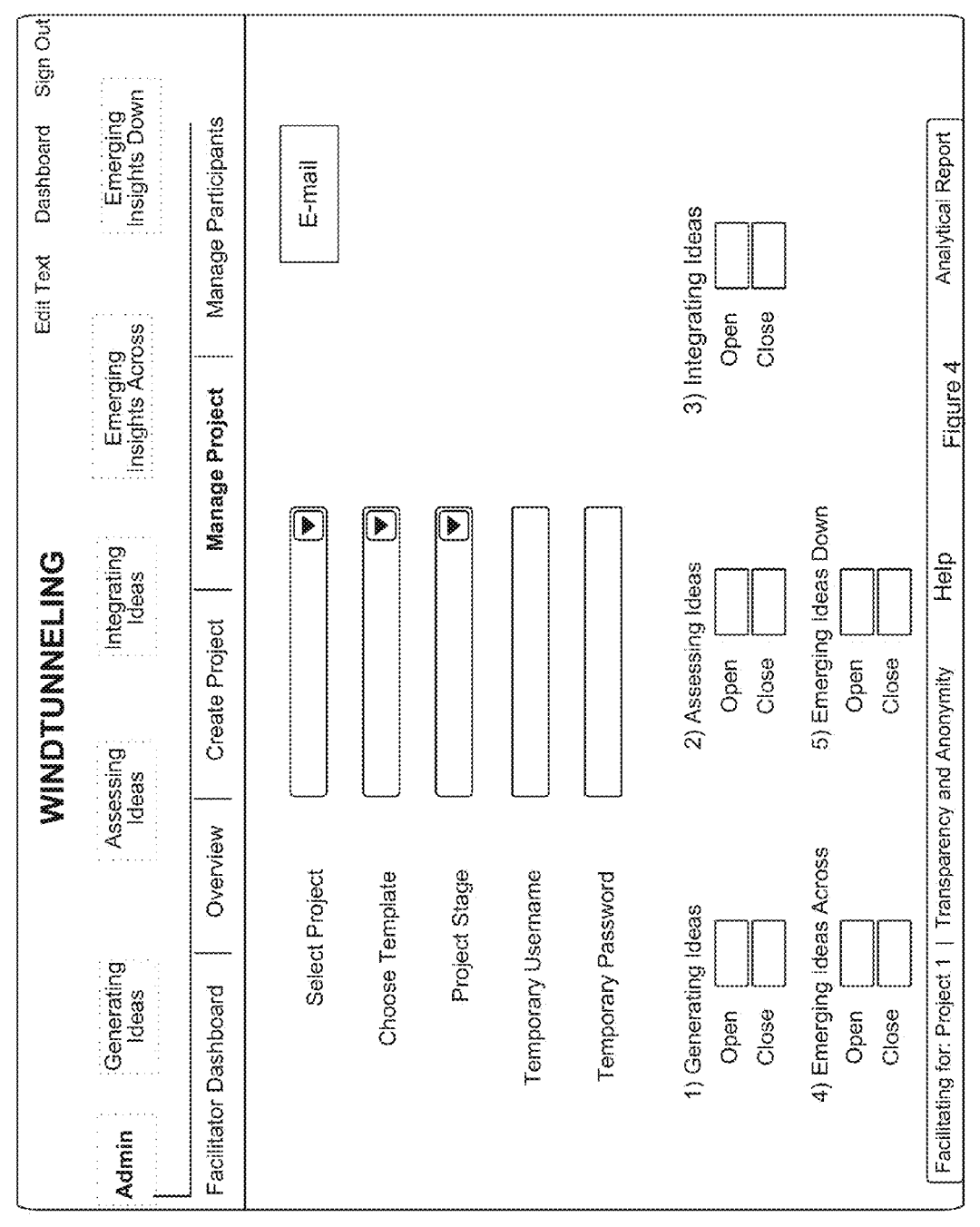

FIGS. 1-5 illustrate an embodiment of a form-based Internet application that consists of a systematic structure of a series of tab forms to set up a framework for a collaborative effort from a group of participants on an issue-exploration process. Each stage in the issue-exploration process is represented by a different tab form presented in a user interface of the application. The series of tab forms are configured to allow the group of participants to perform stages of the issue-exploration process, including generating ideas relevant towards a current issue, assess and assign ratings to ideas regarding the current issue, integrate the ideas amongst other ideas, emerge any insights from the integration of the ideas, and administration of the issue-exploration process. Each of the tab forms have a series of menu options with pursuit-based functionality that can be performed under that tab to perform that pursuit, such as Overview, Create Project, Manage Project, and Manage Participants. These activities can be performed under that tab. The form-based Internet application is configured via the series of tab forms to enable and collect knowledge and insights from the diverse group of participants during the stages of the issue-exploration process. The results collected from the knowledge and insights of the participant users are then presented to all the participants by the form-based Internet application on their client machine. Note, the form-based Internet application has an open framework with the stages of the issue-exploration process in that an actual content of the ideas contributed by participants actively shapes progression of the issue-exploration process from the initial issue to the current issue in the issue-exploration process.

The User interface and the Administrative tab form are shown for the form-based Internet application with functionality on this tab form so a facilitator may create projects (See FIG. 3), manage projects (See FIG. 4), manage participants (See FIG. 5), and more.

The form-based Internet application provides a computer assisted method of enabling and collecting knowledge and insights from a diverse group of users engaged in iterative processes to effectively manage a complex issue. A computer-based user interface with its series of tab forms is used to present the complex issue on one or more client computers. The participants may use client computers and browser software to access the network, get connected to the server computers, and be able to provide their knowledge and insights. The computer-based user interface enables the users to share and compare their initial knowledge, ideas, and observations about the complex issue. Diverse results collected from the users are then presented to all users anonymously. All participants contribute to patterns and emergent insights based on reviewing various subsets of the observations of their peers. The computers may utilize a form-based Internet application comprised of several modules including but not limited to WindTunneling™ Insight Mapping; Conversation Insight Mapping; Coherence Insight Mapping; Learning Narrative Insight Mapping; and Over-the-horizon Insight Mapping. The computers may utilize an Internet application that is primarily resident on the client machine itself and communicates with other instances of that application.

Discussed below are some examples to show the interconnection and capabilities of the series of tab forms that go through the issue-exploration process. The User Interface and its series of form pages for the form-based Internet application are coded to facilitate the following two examples (Examples 1 and 2).

Example 1: A leadership team believes a loss of top production is occurring from two departments and directs an inquiry. Their HR team chooses some key people and sets up a Facilitation Team to design the WindTunneling™ project. The initial findings by anonymous participants indicate that if the loss of top production is the focus, people have little to say, or are unwilling to say much. However, when the team explores the initial ideas more deeply by opening a "blank slate," they discover that there are more significant underlying issues related to inadequate/mis-directed resources, unclear direction, and favoritism by several long-term managers, or the legacy of a closed-minded management prior to being acquired. The loss of top production is merely a symptom, and it was the content of the ideas that redirected the shape of the process that the Facilitation Team creatively developed, constantly adapting based on the ideas contributed.

The Facilitation Team could have begun the exploration with an Assessing Ideas Stage. The team could find wide standard deviations among answers to questions about the causes of the loss of top production. This would lead the team to suspect that there were more issues at play that were significant. The team would then begin to design a Generating Ideas Stage to invite the participants to share what they thought about why the loss of top production was occurring. The team would realize after several days that there appears to be group think going on, and that the ideas were fusing prematurely. The team could also decide to include a broader range of participants, including some of the people who had left the organization. The team could set the Generating Ideas Stage in an iterative round function, and give the participants five more days to share their ideas.

When they open the initial Assessing Ideas Stage, every participant gets to see everything, and there would be a wide array of "reasons" and "observations" and "connections" that were contained in an initial set of three categories. The Facilitation team could see some major areas of concentration, so they could then set a Round 2 in the Generating Ideas Stage and retask the group on the Overview/Landing Page with directions to focus on adding specific new observations in addition to the existing three categories. They could build on original "seed" ideas or generate new seed ideas. They gave the group three days, and set the project on limited flow for Round 2 of the Generating Ideas Stage.

What emerged was a set of about eight main categories where there were dysfunctions that appeared to be significant enough to the participants, individually and collectively, to cause loss of top production and to act to disengage the vast majority of the participants from working at their peak.

The Facilitation Team could take these eight categories and set them up in the Integrate Ideas Stage. They then could set up various segments of the organization across the top of the matrix, and on the landing page directions, and ask the participants to go into each cell and contribute ideas for how that segment could support improvements in that dysfunctional area. The Facilitation Team could set this up in a tab form and give the group ten days to work on the matrix. After six days, they would realize that the activity was dropping off so the Facilitation Team could decide to invite additional participants and extend the time for four more days.

The quality of the ideas would be strong and diverse, and the participation would be robust. In addition, the participants would be discussing ideas, across the buzzing organization, and more and more people would want to participate. Thus, the Facilitation Team could invite more participants as they opened up the Emerge Insights Down and Across Stages, and use ideas from the Generating Ideas Stage that suggested that they have cross-department teams do the clustering and emergence. From the collected information and insights gained, the leadership team would be able to form a plan of action, and in addition, participants have learned a great deal about how the organization works and can be improved.

Example 2: The management may have concerns and want to explore cost over-runs so they can stop them. When employees feel increasingly comfortable sharing what they know and really think, the ideas generated could indicate that there are flaws in the hiring processes (key people lack skills/experience), budget irrationalities that would otherwise go undetected, and other factors as part of a complex set of patterns deep behind the cost over-runs. By opening up a Generating Ideas Stage, and then allowing additional Rounds to let employees share additional related ideas or challenge ideas with new perspectives, the team would help all participants (and the leadership team) unearth the dysfunctions and identify new pathways that can work. It may appear early that the supply chain needs to be involved, and the Facilitation Team would then invite them to come in and join the issue-exploration process. Within a week, the leadership team, and all the participants would have a much more comprehensive idea of what is behind their costing structures and causation patterns, and thus, what needs to happen.

The form-based Internet application securely allows individuals to assemble in a collaborative effort to enable this diverse group of participants on one or more client machines to contribute on a user interface their thoughts, as based on applying two or more strategies against each other, for example, plausible future events, generated by the participants, to anticipate a diversity of future outcomes, wherein the thoughts contributed by the participants are stored in a database. The series of tabs on the user interface includes each tab representing a different stage in the systematic process and framework, and set up the development of a particular issue in order to develop the highest quality ideas from the participants.

The form-based Internet application has an open architecture and built-in capacity to customize/modify the text on every page, which enables the use of this complexity navigation application to include issues such as "future events" and "strategy" as well as market research, policy development, research monitoring and crowd-sourcing, etc., all enabling an end user to capture the "wisdom of the crowd" when there are hundreds of participants, in multiple languages simultaneously, contributing their thoughts on the issue.

As a facilitator and architect of framing the issue to be addressed, one can design a palette of fields and associated fillable templates that are incredibly flexible. As a facilitator, one can make significant changes in the direction of the processes during the project without being limited to living with the parameters and fields initially set up for the project.

As a facilitator, one can enable users to work in "real time" in multiple languages, and host the directions for users in multiple languages. The application includes language translation software. Also, in an embodiment, participants in Round 1 give their input in a first language. Next, in Round 2, overnight from India, the same ideas will be translated and linked so that the same idea appears in both languages.

The series of tab forms are coded to present on their client machine when a facilitator makes decisions. Those decisions are transparent and presented on at least one of the tab forms to all participants, which protects against bias occurring in the issue-exploration process. The series of tab forms are also coded to present any information that is generated by any one of the participants, and that information is then stored in the database and made available to all of the participants by being presented on at least one of the tab forms to each participant via their client machine.

The form-based Internet application in the, "Generating Ideas Stage" utilizes function-Categories. The form-based Internet application has the capacity to create "ROUNDS" of input, coded by the category choices, which the facilitator can modify for Round B, Round C, etc. This gives people the power, intimately related to Conversation Mapping, in the sense that they respond to the ideas of others, tagging them so that users can watch the threads of ideas emerge, while also opening the door for users to build on the sequential, iterative development of ideas.

The form-based Internet application is coded with the ability to modify what the user sees and responds to, away from just future events/risks/strategy to ANYTHING, and opens up the GENERATION OF IDEAS without limiting us to the TESTING OF IDEAS. The form-based Internet application is coded to do both, and is easily customized for specific clients/users.

In using the form-based Internet application with these variable dimensions, a crucial value is that not only can users generate and test ideas from all directions, they are now able to make sense of enormous and diverse inputs from all uses, and extract insights that are relevant to various stakeholders.

The form-based Internet application is coded for Coherence Mapping, which is proving to be highly valuable for complex issues management, and with the new functionality. The form-based Internet application is coded to use an Integrate Ideas Matrix to develop or identify coherence or incoherence in a set of inter-connected variables. Now that form-based Internet application is coded to change the language and text into whatever the user wants, for example, directly entering the vertical/horizontal axis headings, the multiple language Matrix enables a user to ask how and why across multiple departments in different countries. For example, Finance and Marketing would respond to the question, "What do you need from us to fully execute your scope of responsibility for this project?" Finance asks Marketing, and then listens. Marketing then asks Finance, and listens. Then, the entire group reveals to itself the disruptive "different but previously opaque expectations", and the gaps can then be identified and addressed openly.

The issue-exploration process is more artistic than predictably methodical. The internet form-based application is structured to provide a system with a framework that is set up to resolve a current issue but it is also a fluid architecture to flow through any portions of the framework that one chooses to use to explore for a current or derivative issue. The fluid architecture of the application allows a facilitator to be free to shape and sculpt the social learning and exploration in the stages of the issue exploration process notwithstanding the limitations of technology.

FIG. 1 illustrates how the form-based Internet application allows the Facilitator Dashboard pursuit to be clicked on and how the user interface displays various projects. The Facilitator could click on the example Project 1: "Airline research" and depress a "Facilitate" button. At that point, the form-based application will vault a user into that project and you can see what the facilitator now has at her/his disposal. Project set up will use a number of templates and fields to set up that project and maintain control over that project. The series of tab forms will contain the stages of issue-exploration such as Generating Ideas, Assessing Ideas, Emerge Insights Down, Emerge Insights Across and other similar stages.

Project Set-up under 'Create Project' button enables a user to create new projects. Enter all of the requested information including the chosen name and description in the blank fields; then click the 'Submit' button. The online web application may present a number of web pages as templates to assist in this on-line process. However, notably these templates as discussed are fully customizable as discussed herein, allowing the application to create a structured framework/open architecture that can address a wide array of issues.

FIG. 2 illustrates how the form-based Internet application has customization areas, which include the Overview/landing page for each pursuit. The facilitation team uses the user interface to outline the big issue to be explored and the directions to the participant, as based on the findings of the previous stage.

FIG. 4 illustrates how the form-based Internet application allows the Facilitation Team to use the Manage Projects pursuit in the user interface to add text on, for example, each page, where the participants contribute to add in an open space to give or modify the directions to the participants, based on the findings of the previous stage. Fill in a date in the pursuit close date field. Send the Participants an email alerting them of the upcoming close date. You send this email several days before the actual close date to encourage the Participants to prioritize their time so that they can contribute fully to this activity. For a "draft" email, click on "Help" in the bottom navigation bar. The Facilitation Team may copy and paste the "draft" into your own email communications with the Participants.

FIG. 5 illustrates how the form-based Internet application allows management of participants' activity. The following lays out an option for the Facilitation Team to utilize to shape or reshape the process, while taking into account the ideas of the participants in the reshaping process. Which participants will be invited and given credentials to participate? New participants can be added at any point in the process, depending on the needs of the project content. The Facilitation Team may begin with an initial set of participants, and then shift to "auto-registration" and invite a broad and diverse new group of participants to join in the process.

Participants may also be deleted. Once the process is underway, the Facilitation Team may view the contributions and determine that there are gaps in the perspectives that are represented, and thus seek out and augment the diversity of the participants, inviting additional participants with specific expertise/knowledge areas to complement the content of the project's idea base.

At any point, in any of these rounds or stages, additional participants may be added who have only "READ ONLY" credentials. This can enable a wide variety of people to share in the exploration without actively participating: thus, the "grass roots" of an organization can be opened up to the top leadership and the candor and ideas can nourish the health of the organization as a whole.

FIGS. 6 and 7 illustrate an embodiment of the "Generating Ideas" tab form coded to show the current issue being explored and having functionality on the generating ideas tab form for each participant to contribute their idea with a title and description. The "Generating Ideas" tab form may present a series of menu options with accompanied functionality such as "Overview", "Participant's Contribution", & "See Outcomes" of all the ideas contributed.

Referring to FIG. 6, the "Generating Ideas" tab form gives the participants a "blank slate box" to share whatever perspectives or knowledge that they believe to be relevant and significant to the current issue being explored without presenting the participants a fixed list of options to provide their input on. The participants contribute their idea with the title and its description into the corresponding blank slate boxes on the "Generating Ideas" tab form so that every contributed idea is documented in the exact words supplied by the participant and no restrictions constrain what idea can be contributed. For example, a first participant in a second round, Round B, can contribute his or her idea assigned ID 2251 on the issue of 'Arrival at Airport to Take Off.' The first participant will enter a title of the idea 2251 and its corresponding fleshed out description into the corresponding blank slate or "empty" boxes.

The "Generating Ideas" tab form page is the opposite of a survey with fixed alternatives from participants, and rather offers "blank slates" for the participants to determine relevant and significant ideas to contribute, in their own words, unfiltered by a facilitator or moderator. The full transparency enables all participants to see all ideas, uncensored. Every contributed idea is documented in the exact words of the participant. Each participant is given a current issue to submit an idea about and trusted with a blank slate, setting no restrictions on what idea to contribute. This is significant in that all participants can review, rate, integrate against or with each other, and resort all ideas to trigger new ideas from the documented activities.

The user interface gives each participant "blank slates" in that they are free to include ideas from any/all directions that they believe are relevant to the issue under exploration. Most group programs force participants to selected choices, shaping their responses and their thinking. The "Generating Ideas" tab form page does the opposite: the application has designed processes that can be used non-linearly to invite as much diversity as possible so as to illuminate the complex issue from as many facets as possible. However, the framework of both i) the participant's contributed idea being displayed to other participants and ii) a mechanism present for each participant to quantitatively respond to or assess an idea (i.e. each participant can rate the choice provided by a participant) opens up "conversational and exploratory possibilities within the safety of the virtual environment."

The Generating Ideas stage may have iterative rounds, such as Round A, Round B, etc., which enable participants to respond in Round B specifically to any idea from Round A, as well as add new general ideas. The Categories can be reset for Round B, and subsequent rounds, depending on the content of the ideas.

Four of the five stages of issue-exploration are qualitative and not subject to quantitative analysis, in the conventional sense. However, the participants advance and build on ideas that to them, show promise or potential, based on their own judgment. The facilitator can then advance these high potential ideas into more development opportunities using additional activities of the overall process. These high potential ideas can also be subjected to quantitative review by the participants in the Assess and Assign ratings Stage, and the results of that assessment can be the basis for further opportunities to generate new ideas or recommendations.

As a Team, add in a number of initial Project Categories to appear on the Participant's "Generate Ideas" tab form. Choose Categories that are most relevant to the Ideas, which you have selected to test in the issue-exploration process. In addition, be sure to include "Other" for participants who may imagine an idea outside the named Categories.

An initial set of categories for contributions may be set in the issue-exploration process, and then additional categories can be added during the process if/when the content of the contributions dictates that it would enhance the diversity/quality of the ideas that are generated. For example, if the Facilitation Team determines that there is a high percentage of ideas that are categorized as "Other," and they view the content of these ideas by sorting them and reviewing them, they may add additional categories that reflect the general thrusts of the ideas originally bundled as "Other." Thus, future contributions will be different based on insight from the content of the initial categorization by participants.

Categories support participants in organizing and reviewing contributions to build emergence and new patterns, thus, by adding new categories where the need is evidenced by the contributions-to-date, the Facilitation Team modifies the process based on the participants' ideas themselves.

After confirming the Pursuit "Close Date" and inputting the Categories that have been decided upon for this project, the Facilitation Team opens up the "Generate Ideas" stage and sends out an email inviting the participants to the project. Draft emails are in the "Help" section, which is found on the bottom navigation bar of the "Open" page of "Generate Ideas."

When the participants actually gather together to work on the project on their client machines, the Facilitator should welcome everyone, and explain that this is a shared effort to support the adaptability, innovation capacity and resilience of the organization as a whole. The application is a cutting-edge way to support decision-makers; and by thinking and working together in unorthodox ways, they will break through the usual barriers created by silos and hierarchy, fear and self-optimization, while learning more about the organization. The Facilitator can stress that there are no constraints on the kinds of New Ideas that they might imagine: any time, any place, engaging any group of people or just the natural world. The Facilitator might remind them that their Ideas can reflect Ideas that are overwhelmingly positive, overwhelmingly negative, or a mix.

Referring to FIG. 7, the "Generate Ideas" tab form can be initially set in "Open Flow," which allows the participants to look forward to "See Outcomes" and see/consider the ideas that have already been contributed, before and after contributing an idea of his/her own. In the Facilitator Program, depending on the group, and flexible depending on content of the ideas, the facilitator can shift from Open Flow (participants can look to the See Outcomes pursuit, and then add new ideas based on what they see) or Limited Flow where they have to wait until a certain date, when the "gate" opens and everyone sees everything. The former emphasis a more "conversational shape" and the latter promotes "independent judgment" of each individual. These can also be shifted mid-way in the iterative rounds of the Generate Ideas stage. This can inspire people with the general context of the exploration and also encourage participation.

However, this has the risk of promoting "group think," and depending on the history of the participants, the Facilitation Team may set the initial up in a gated state, which blocks the participants from seeing outcomes until an identified time has passed. Afterwards, the gate is opened and all of the participants are able to see all of the ideas contributed and sort them in various ways. This Limited Flow option promotes independent judgment and is less like a conversation than the "Open Flow" set up.

Depending on the initial ideas contributed, the Facilitation Team can switch from Open Flow to Limited Flow. If the Facilitation Team determines that "group think" (undue influence from a few ideas dominate the scope of exploration) they can execute a "redesign" and reset the project into a Gated Limited Flow state. In this way, participants will need to rely on their own judgment and ideas, and see the outcomes after the date set.

Similarly, if the Facilitation Team views the initial ideas contributed and determine that some/many participants need a bit of a prod or inspiration from the ideas of others, they can redesign by resetting the project into Open Flow and allow the ideas contributed to stimulate participants to generate additional ideas to be added to the original ideas submitted.

By clicking the "See Outcomes" tab, the Facilitator can check on how the contributions are flowing while the Stage or Round is still open. When the Facilitator notices that a key Category is under-represented, in the facilitator's reminder email, he or she may ask the participants to focus on generating Ideas in that Category or Add/Modify a Category to respond to the existing inputs from participants. The Facilitator can also encourage participants to take the time to look over the "See Outcomes" screen after the "Generate Ideas" close date: where all of the Ideas are displayed in English and/or one or more alternative languages.

Referring to FIG. 7 again, the ideas are supplied anonymously by participants of the group via a random unique ID assigned to each contributed idea, so that the quality of the idea is separated from quality of the idea is separated from who contributed the idea, and the current issue in the issue-exploration process displayed on the first client machine is driven by content from the ideas contributed by the participants and assessments of those ideas. Participants supply ideas anonymously by having each contributed Idea be assigned an ID that is associated with the contributed Idea. For example, a first participant in the category flight experience, contributes an idea titled "Fire on the plane," assigned an ID 247.

The User Interface conceals the participant's actual identity. An ID is assigned to the idea so the participant remains anonymous from the contributed idea itself. Participants remain anonymous from other participants throughout the interface. IDs are given to individual Ideas as a reference for others and cannot be reverse attributed to any individual participant. An identity of that participant is hidden from the other participants and even from the management layer in order to abstract the identity of the participant from the quality of the idea. Tracking software may determine meta data type of information such as a quantity of ideas coming from a particular participant, but merely the results of the meta data is typically accessible to the management layer. The anonymity of the participant allows for emergent Ideas. The identity of the participant is registered in the database but the identity of the participant is shielded from the facilitation layer and a participation layer of the application. Thus, facilitators and participants cannot see who contributed that idea. In addition, the amount of participants participating and which client machine is supply the ideas can be determined with the meta data when the analysis layer of the application looks who is enrolled and how many people participated from the group of participants, but not what ideas came from a particular participant. Thus, the identity of the person contributing a particular idea is shielded from the analysis layer as well.

Participants' contributions to the issue-exploration process are anonymous. Anonymity promotes candor and enables the group to benefit fully from all of the perspectives of multiple, diverse participants. This diversity of perspectives is essential for effective systemic work. Anonymity creates a space within which participants can feel safe sharing their thoughts, observations, feelings, knowledge, and concerns about the ideas under consideration. In the issue-exploration process, anonymity means that the participant's attention is shifted quickly from "Who said that?" to "What is the possibility latent in that idea?" This shift frees up energy and brings more focus into the process. Anonymity offers the organization the benefit of insights held by the participants. Anonymity offers the participants the safety to be candid about their observations and insights.

Next, there is also a search function that allows you to see only those Ideas that contain whatever words or phrases you are interested in. Nevertheless, please note that the search will be limited to the Ideas in the Category, which is highlighted in the box. The search function remains on until you delete all text from the search box.

Transparency as a Principle

All the information that is generated by any of the Participants is available to all of the Participants. For the group to benefit optimally from the issue-exploration process, it is essential to have open access to all the ideas that have been generated. Participants' imaginations are stimulated by their fellow Participants' thinking and new ideas are spawned—sometimes during the issue-exploration process, sometimes months later. The form-based Internet application distinguishes from more conventional, quantitative processes by being a qualitative and quantitative collaborative process. The form-based Internet application is a social collaborative process rather than a "face-to-face" process for group exploration. The "Generating Ideas" tab form for the form-based Internet application allows every idea to be documented in the exact words of the participant. Thus, each participant has blank states and no restrictions on what idea can be contributed. Next, all participants in the group of two or more participants can review, rate, and resort all ideas to trigger new ideas from the documented activities. Each participant can submit and omit the ideas for some activities and revisit others, giving radically different "sources" for stimulating new ideas during the duration of the project. All of this amplifies the iterative weaving as well as the ability to go forward and backward in the stages of the development process and relationship-identifying qualities of the development process. The development process is a delicate balance; a systematic set of forms in the user interface and freedom to generate ideas, evaluate the ideas, emerge and evolve the ideas, formulate a plan of action, and the decisions along the way are highly informed by participants, directly and indirectly. The collaborative group of participants can evolve the ideas into a final outcome, and then formulate a plan of action on the final outcome, which is significantly different than originally projected.

FIG. 8 illustrates an embodiment of the Assess and Assign ratings to the Idea tab form, which is coded to both i) present a set of contributed ideas to be displayed on their client machine to all of the participants and ii) present a mechanism on their client machine for each participant to quantitatively assess both 1) an impact of the idea and 2) a probability that the idea may occur or be implemented, for each of the contributed ideas in the set of the contributed ideas, where the coding in the assess and assign ratings to the idea tab allows a facilitator to choose to include in the set of contributed ideas presented on the assess and assign ratings to the idea tab including i) all ideas contributed from participants in any of various rounds of the "Generating Idea" stage, ii) a subset of the ideas from the various rounds of the "Generating Idea" stage, iii) independent ideas to be assessed that come from other sources than the "Generating Idea" stage, and iv) any combination of the three.

In the Assess and Assign stage, the impact & probability are part of a set of independent criteria that the facilitators can select for assessment. Each independent criteria has a customized modifier such as feasibility (criteria) within this budget cycle (modifier); likelihood of support (criteria) among my district (modifier). Also, they can input ideas/conditions directly into this stage, and then have participants move to the Generate Ideas stage about the assessment findings. This non-linear functionality assists to satisfy the need to modify the issue-exploration-process based on participant responses.

The series of tab forms, including i) the "Generating Ideas" tab form and ii) the assess and assign ratings to the "Idea" tab form displayed on the first client machine are coded to make the identity of a participant remain anonymous from other participants, as well as any management layer of the form based Internet application in order to abstract the identity of the participant from the quality of the idea. Participants can both contribute and assess ideas anonymously. The idea and its assigned ID are displayed and a participant can assess a numeric rating on both 1) an Impact of the idea and 2) a Probability that the idea may occur or be implemented. The outcomes of all of those assessments from all of the participants may also be displayed. For example, the Clean the AIR and Let us Breathe idea with an ID of 2173 may have an average impact rating of 7.67 and an impact rating taking into account the probability of the idea occurring of 7.33.

The issue-exploration process can begin with the assess and assign ratings stage, or the assess and assign ratings stage can come after one or more other activities depending on the evolving shape of the project as it is informed by the content of the ideas.

For example, depending on the content of the ideas in the "Generating Ideas" stage, one or more ideas may be advanced to be assessed by the group according to two modified criteria set by the Facilitation Team. Which criteria are chosen, and how they are modified depends on the original design for the project and the content/direction of the project as it is unfolding. There is no set formula that prescribes the choices of the Facilitation Team. Thus, the ideas that are developing can heavily shape the next steps of the process, if assessment is a supportive activity at this point.

In addition, the Facilitation Team may choose all ideas from any of the various rounds, a subset of the ideas from the various rounds, or may include independent ideas to be assessed that come from other projects, the content of other related projects, or from other sources.

Similarly, if the project began with Integrate Ideas, some of the ideas generated may be set up in the assess and assign ratings stage, building out customized criteria (with unique modifiers for that assess activity), based on the tenor or scope of ideas generated in the "Integrated Ideas" stage.

If the Insights that are emerging from the Emerging Insights Down or Across are promising, the Facilitation Team may select some/all of these Insights to include for assessment in the "Assess and Assign Ratings" stage by the existing participants. Additionally, the Facilitation Team may decide to augment the participant pool by inviting a broad group of individuals who were not involved in the first three activities, and now include them in the "Assess and Assign Ratings" stage.

The facilitator can choose those Ideas that you want the Participants to assess for Probability and Impact (or other criteria) by clicking on the boxes in the list of Ideas below. If you wish to print out the Ideas to work with during your selection process, there is a print function on the Participant's "Generate Ideas-See Outcomes" page. Similar ideas generally fall into a given category.

The Participants have to assess the Impact and Probability/Variable of an Idea written by a fellow Participant based solely on their own imagination of that Idea; a clear and concise statement of the Idea is essential. You will be on the lookout for diverse Ideas that are clearly written and readily understood by the majority of the Participants.

Participants usually work through this Stage fairly quickly, reading the Idea and Commentary and intuitively rating what level of Impact they think it would have on the individual, group or organization, or how Probable it is for that Idea to inform improvement within the organization or system under review. Roughly a fourth of the Ideas that they rate, they will see again later in the other stages of the issue-exploration process; but next time they will work with the Ideas using more discerning, critical thinking skills.

Encourage Participants to click the "See Outcomes" section once the "Contribution" step is closed so that they can explore the findings. The results of this Stage give both Facilitators and Participants a statistical display of the assessments made by all Participants. Typically, the most significant Ideas are 1) those, which are High Impact/High Probability/Other Criteria, 2) those that are High Impact/Low Probability and 3) those Ideas where there is a strong difference of opinion among the Participants, i.e., those with high standard deviation.

Next, the systematic structure of the series of tab forms sets up the framework for the initial issue and a preliminary outcome in the issue-exploration process, and where the coding allows actual content of the ideas contributed by participants to actively shape a progression of the issue-exploration process from the initial issue to the current issue in the issue-exploration process. The facilitator initially sets the initial issue and the preliminary outcome and then a different derivative discussion path on the current issue and a different outcome than what was initially mapped out occurs based on the actual content from the ideas contributed by the participants and assessments of those ideas.

The facilitator initially sets a preliminary or draft path of stages. The architecture of the system's process and the user interface set allows the actual participant-driven original ideas/content to modify the preliminary path. The user interface allows new participants to be added, categories to be modified, or deeper penetration or extensions of the ideas by using additional "rounds." Facilitator is an ongoing design process, making choices of which of the five activities is most appropriate as a next step, which activities should be omitted, and what sequencing will enhance the quality of the insights. A single unexpected idea or a cluster of new insights enables the facilitator to redirect the convergent or divergent direction of the participants using different activities than were in the preliminary path.

The facilitator may initially map out a predicted discussion path, outcome and architecture of the system and user interface set that allows the actual participant driven discussion to generate a different derivative discussion path and outcome than was initially mapped out.

The Facilitator monitors evolving ideas being generated and driven by the group of participants themselves, adds some criteria, such as Quality, Diversity, and/or Potential of the ideas. The facilitator monitors the direction the idea as it's proceeding and arrives at a decision point to continue a stage, to open a new stage or to close the stage.

Integrate Ideas Stage

The Facilitation Team can begin a project with this "INTEGRATE IDEAS" stage, setting up independent variables that the organization or community group has recognized in some way to be relevant to their efforts and purposes. This could be statistics, policies, practices, resources, etc. The stage integrates the ideas amongst other ideas that were contributed. The purpose is to open up exploration and conversations about the relationships among the variables, and how those relationships are perceived and understood by a wide variety of participants. Through this learning and exploration, new options for improved practices and policies, artfully shaped by the Facilitation Team can emerge from the collective intelligence of the participants.

As the cells become populated, some will receive more attention than others: this can be because of lack of interest or knowledge, and that is relevant to the subsequent design.

After an initial window of time with an initial set of participants, the Facilitation Team may recognize that there are areas of interest that could be further elaborated, and they can add additional new columns and one new row of variables. They also can invite a much broader, more diverse group of participants, including their elected officials and their staff.

In this way, one may begin with Integrate Ideas and based on the participation content and activity, modify the process to enhance the development of the ideas.

Certainly, the Facilitation Team could have taken the insights from the Emerge Ideas Across stage and put them into the Assess Ideas Stage for further and more refined quantitative data, should the media or elected officials seek such data. In addition, the findings from the Assess Ideas Stage could be exported to Excel with charts and graphs prepared in addition to the scatter graph. With these published in the local media, a second project could be opened with an auto-registration, asking participants to Generate Ideas about the Assessments. Existing participants in the original program could also be invited to Assess Ideas and then enter into a subsequent Generate Ideas Stage based on the Assessment and on the Insights that emerged from the earlier stage. All of the design of this project stems from the purpose of the project as it unfolds, and upon the content of the ideas and the creativity of the Facilitation Team in supporting the development of the ideas.

FIGS. 1-9 illustrate an embodiment of the series of tab forms corresponding to the stages of the issue-exploration process, which are coded to have a non-linear order of progression through the stages of the issue-exploration process, including being able to migrate forward and backward through the stages while also being able to skip over other stages, by activating a desired tab form when progressing through the stages of issue-exploration that evolves ideas into a potential plan of action. Thus, the series of stages do not need to be proceeded through in any sequence, rather a non-linear order of progression through the stages exists. The user interface has options for the Facilitation Team to shape and then reshape the process to take into account the ideas of the participants in the design/redesigning process. For example, four possible project paths to illustrate the non-linearity of the issue-exploration process in the application. The stages of the issue-exploration process generating ideas relevant towards a current issue, assess and assign ratings to ideas regarding the current issue, integrate the ideas amongst other ideas, and emerge any insights from the integration of the ideas, have a non-linear order of progression through these stages. Further possible project paths can be created depending on a facilitator's crafting of the issue-exploration process. Creative interaction between the ideas contributed in the current stage of issue development and the shape of the next steps of the exploratory process to take. Non-linearly/sequentially progress through the series of tabs enables users to move back and forth, developing their insights and emergent ideas, and assessing new ideas against unlimited criteria that can include impact and probability; significance; capacity to execute; perceived value by a particular target market. The on-line web application is programmed with tabs to give the users the ability to migrate "forward" and "back" across the five main stages, which lets new participants enter into "Integrate Ideas," get their feet wet with the "inferential" thinking that is required, and then move back to build on strands of ideas that appear to be highly significant, generating new ideas and testing them. This "directional" innovation and alternative use of time has proved highly powerful. Participants can come for a couple hours and walk out the door with significant revelations about their issues/organizations. As a facilitator, one can "design in reverse," enabling users to move back and forth, developing their insights and emergent ideas, and assessing new ideas against unlimited criteria that can include impact and probability; significance; capacity to execute; perceived value by a particular target market; etc.

Through the series of tabs, the user interface presents a flexible, systematic, in stages development process that evolves ideas including a potential plan of action based on the content/quality of the ideas contributed by the un-identified participants. The series of tab forms of the form-based Internet application are coded to facilitate the development and sharing of ideas, beginning with an original "issue in focus" or "problem" or "opportunity." The key to the open architecture of the form-based Internet application is that the actual content of the ideas contributed by participants actively shapes the process of the exploration and development.

The facilitator initially sets a preliminary or draft path of strategy. The architecture of the system's process and the user interface set allows the actual participant-driven original ideas/content to modify the preliminary path. The user interface allows new participants to be added, categories to be modified, or deeper penetration or extensions of the ideas by using additional "rounds." Facilitating is an ongoing design process, making choices of which of the five stages is the most appropriate as a next step, which stages should be omitted, and what sequencing will enhance the quality of the insights. A single unexpected idea or a cluster of new insights enables the facilitator to redirect the convergent or divergent direction of the participants using different stages than were in the preliminary path.

The facilitator initially maps out a predicted discussion path and outcome and then the architecture of the system and a user interface set that allows the actual participant driven discussion to generate a different derivative discussion path and outcome than initially mapped out.

FIGS. 9 & 10 illustrate an embodiment of the series of tab forms that are coded in order to facilitate an iterative process in different rounds of a same stage of the issue-exploration process, where one or more of the stages of the issue-exploration process can be repeated in a subsequent round of the stage in the issue-exploration process based on reviewing the knowledge and insights contributed by the participants in an earlier round of that stage. FIG. 9 shows multiple rounds, such as 3 rounds, of contributing ideas, assessing the ideas, and emerging the ideas by the participants, which can occur in the issue-exploration process in order to create multiple possible project paths in this process and resulting outcomes.

FIG. 10 illustrates multiple stages including an "Assess and Assign Ratings" stage where a qualitative assessment and quantitative assessment of the quality of ideas occurs, and a generating ideas stage in which a subsequent idea generation round occurs. A first instance of the "Generating Ideas" tab form collects the knowledge and insights contributed by the participants in the earlier round of that "Generating Ideas" stage to create a first set of seed ideas. In the Generating Ideas stage in the "Manage Outcomes" pursuit, participants give responses to and feedback about the quality of the seed idea. In the "Assess and Assign Ratings" stage, participants rate each idea on two or more different criteria, such as Impact and Probability. The metrics from the participant ratings can include average and standard deviation ratings. The Facilitator uses participant generated assessments of idea quality to inform the design of the next idea generation round. The Facilitator can create a subsequent round of the idea generation stage as well as create project categories. The Facilitator can add new categories that emerged as important. On the participant interface for the subsequent round of the idea generation stage, the facilitator creates new instructions and supporting text for generating ideas in the new round. A second instance of the "Generating Ideas" tab form collects the knowledge and insights contributed by the participants in the subsequent round of that "Generating Ideas" stage in order to generate derivative ideas and new seed ideas after the participants assess the first set of seed ideas from the earlier round of that "Generating Ideas" stage.

The iterative process in different rounds of the "Generating Ideas" stage looks at new seed ideas and derivative concepts/ideas from the initial set of concepts the user interface presents. The new seed ideas and derivative concepts/ideas in the generating idea stage are provided by the participants and the Facilitator's role in establishing the set of concepts presented to participants in a subsequent stage, which all differ from the first round's seed concepts. The user interface screens the process within a given tab and allows the participants and the Facilitator to initially assess the rated quality of the first set of seed ideas or information and then look at that first set of information and generate derivative ideas or new seed ideas in the next round of discussion within that stage.

This iterative process of repeating rounds within a given tab of generating ideas involves participants going back and looking at the original set of seed ideas and then making derivative ideas and some new seed ideas based upon looking at the originated generated ideas, which is all driven from the participants looking at those ideas.

Based on the quality/characteristics/variety of the ideas in Round 1 of the "Generating Ideas" stage, the Facilitation Team may determine that the participants would benefit from additional review and reflection of all of the ideas generated to date. Depending on the ideas, they may set up one or more additional rounds for the participants to use to expand and further develop the original "seed" ideas, or contribute new ideas that come to them through their review and off-line thinking/conversations.

Once the initial set of ideas has been generated, the Facilitation Team reviews them and studies them by category and emphasis. At this point, depending on the scope of the ideas/quality of the ideas/variety of contributions— the Facilitation Team can set a second Round of contributions. They can design for a short time or a longer time, depending on the complexity/quantity of the ideas that need to be reviewed by the participants. The Facilitation Team can also provide alternative directions for the participants on the "Overview/landing page" of Generate Ideas Stage for Round 2. These new directions can reflect the reshaping of the initial thrust of the project, based on the content of the ideas.

Additional Categories can be set, and original categories can be eliminated, depending on the content of the original ideas. The Facilitation Team may find that the ideas are fairly mature, and eliminate the earlier Categories and set up three new Categories for Recommendations, Insights, or Other. If participants respond to an existing idea, their idea is under the earlier categorization of the seed idea. However, new "seed ideas" would not be shifting focus toward a more convergent exploration process.

The participants have the choice to respond directly to any seed idea from the first round of ideas, and his/her contribution will be connected to that seed idea. Thus, the Facilitation Team can see (even if the Round is gated) where "the action is" and how to support the development of the ideas. The participants also have the option to contribute new seed ideas in Round 2 and not connect their new idea to an existing idea. Additional participants can be invited to join the project for Round 2 and further Activities if there appears to be a gap in the content of the ideas.

If Round 2 is in Open Flow, then participants can "See Outcomes" and then contribute to "popular ideas" or ignore them. If there has been more "group think" in Round 1 than the Facilitation Team thinks was ideal, they can set Round 2 in a Gated format so that more independent judgment is emphasized. When the Gate is open, all participants can see what is "popular" or drawing a significant amount of interest in terms of responses. As the ideas in Round 2 are contributed, the Facilitation Team may determine that a new category will support the development of a certain thread or strand of ideas: they may add this at any time during Round 2.

In addition, if the participants inform the Facilitation Team that there are disruptions in the organization or that they need more time, and the Facilitation Team can modify the time allowed for the Activities, based on the ideas of the participants.

Modifying Categories and giving participants NEW directions enables all participants to reflect on Ideas generated to date, and add/modify new perspectives based on a "first pass" of participant idea generation. Facilitators invite participants into the next round (Round B for example) with a new and short set of directions that repeats the function but with new "What are my ideas about the ideas thus far generated"

Send the Participants an email telling them that the Stage is now open and they are invited to participate. Click on "Help" in the bottom navigation bar for a "draft" email, which covers all the information that the Participants will need in order to access and use the internet form based application software.

Once one "Round" of ideas is generated, the Facilitator can ADD CATEGORIES and set a new Round and re-invite Participants to respond or question or extend the best ideas in the first Round. This adaptive functionality radically enhances the customization of the process to meet the specific value that has emerged from the first Round, and thus build on ideas that were not available to the organization prior to the first Round of the WindTunneling process.

After round 2, the Facilitation Team reviews the content of the ideas and makes design choices based on the development and direction of those ideas. A third Round and subsequent Rounds may make sense, based on the ideas. Again the landing page can be set to give new directions to the shape of the process, based on the outcomes from Round 2. New participants can be invited to join if there continues to be gaps in the perspectives or it is deemed appropriate. New categories can be set to shift to a more divergent focus or a more convergent focus, based on the outcomes in Round 2.

During the iterative process, a review of the previous presented ideas and their ratings occurs in a qualitative assessment of each idea and the relationship of all of the ideas. Next, refinement options exist in each stage of development of add and remove buttons on the user interface to allow the additions of new categories of ideas and the removal of older ideas that have less quality of influence on the current participant driven discussion. Then a second round/subsequent round of generating new seed ideas as well as derivative ideas from one or more previous seed ideas occurs. Also, a different potential outcome should be shown.

FIGS. 1, 3-5, and 10-15 illustrate an embodiment of one or more of the tab forms corresponding a given stage in the issue-exploration process, and is coded to include refinement option buttons to make changes in i) a next round of the given stage or ii) another stage of the issue-exploration process, and iii) any combination of the two, in order to shape the issue-exploration process while the issue-exploration process is occurring.

Figure 11:
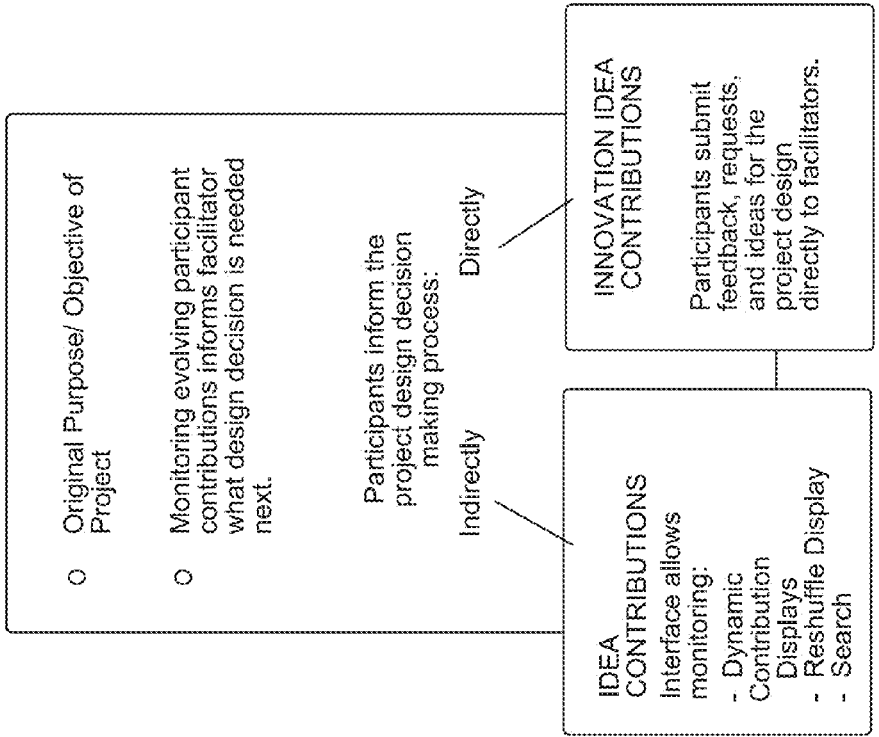
FIG. 11 illustrates refinement options for each project-stage and the basis for project design decisions by the Facilitator monitoring the issue-exploration process.

FIG. 11 illustrates refinement options for each project stage and the basis for project design decisions by the Facilitator monitoring the issue-exploration process. The user interface presents refinement option buttons coded to be selected, and refinements are to be made by a facilitator based on a first pass review of the ideas generated by the participants after completing a first round of the "Generating Ideas" stage. A first set of the refinement option buttons on the user interface for each project stage allow the facilitator to add, remove, or modify at least four of the following i) categories of ideas, ii) participants participating in the issue-exploration process, iii) current issue being explored via direction text on the Overview/landing Page of a given stage, iv) creation of an additional round of reiterating a given stage of the issue-exploration process, v) assigning read-only privileges to a participant, vi) selecting new criteria for assessing ideas, and vii) other refinement options. The basis for project design decisions by the facilitator monitoring the issue-exploration process allows the facilitator to set an original purpose/outcome of the project. Monitoring the evolving participant contributions informs the facilitator what design decision is needed next. The participant's contributions inform the project design decision-making process in two ways. A first way is indirectly, via inferences and insights from idea contributions. The interface allows monitoring via Dynamic Contribution, Displays, Reshuffle Display, and Search. A second way is directly, via innovative idea contributions. The participants submit feedback, requests, and ideas for the project in the issue-exploration process directly to the facilitators.

The systematic stages of development framed in the user interface allows the Facilitation Team to creatively let the ideas be nourished and developed by the participants and then the Facilitation Team makes the appropriate refinement choices among the many unique variables that influence how a group of individuals can come together over time (1 hour to 1 month) to generate effective new and derivative ideas. The user interface allows additions/removal/and organizational functions to assist in the stages of development to be more reflective of the current direction the participants are driving this discussion on the original idea. Sometimes the ideas revealed in the refinement of choices and the iterative idea generation and assessment exploration needs to be more divergent. Thus, the user interface is coded to allow the Facilitation Team to consider and make design parameters for the next step in the development process that can support this: For example, multiple ideas may need to converge under a broader category and/or multiple ideas may need to become more specific. Thus, additions/removal/and organizational functions can be made.

The Open Architecture of the stages of development of the application allows these example changes to be made dynamically and be presented to the participants again with the specific design choices that the Facilitation Teams made, based on the content of the participants' original ideas.

The user interface allows new participants to be added, categories to be modified, for each stage of the development process.

The content of these ideas enable the Facilitation Team to reshape the preliminary design of the exploration so as to develop the ideas of the participants, not to work slavishly on a pre-canned script or survey that limits what can be considered. There are multiple options for the Facilitation Team to use to help refine the ideas so as more accurately reflect the state of the issue or organization, and open up opportunities for improvement. The sequence of activities, the opportunities to build on the ideas of others or to rate a set of options or find emergent new ideas, which all help the whole organization be more accurate and precise in its self-knowledge, and thus more able to respond effectively.

The issue-exploration process is iterative and non-linear, and has multiple variables and options for the Facilitation Team to use to "sculpt" or "shape" the process. Which options or variables that the Facilitation Team chooses to use (at various intervals) depends on their interpretation of the content/quality/variety/characteristics of the ideas contributed by the participants.

The Facilitation Team can include some or many participants, and participants may be added to the Facilitation Team during the evolution of the project. One or more of the Facilitation Team will have credentials to input design changes into the project based on the evolution of the ideas at various intervals.

Thus, the issue-exploration process enables and supports the Facilitation Team to set a preliminary opening issue in focus, problem or opportunity for a preliminary set of participants to consider. Then the process opens up to the following sets of options and variables for the Facilitation Team to employ, based on the content, quality, variety, depth, nature of the ideas, insights, recommendations, and observations that are contributed by the various initial participants. This design choice for the Facilitation Team opens up a creative interaction between the ideas contributed in the current stage of issue-exploration and the shape of the next steps of the exploratory process.

An additional variation is that of time: the Facilitation Team can modify the amount of time as well as the Activities in various sequences, depending on the interest/quality/ideas generated by the participants at the various stages of the ongoing process. The amount of time allocated by the Facilitation Team will shape the ideas contributed. Similarly, if the ideas generated indicate an "immaturity" or "early stage" of development, the Facilitation Team can easily shift the time made available to allow the participants to not be rushed or pressured to give simple answers or superficial ideas. This crucial variable can be monitored through the analytics and the Facilitator's program.

Stage/task organizes the variables open to the Facilitation Team, and there are five stages in the issue-exploration process. However, there may be multiple steps/variations/stages within each stage. Depending on the content of the ideas contributed, the sequence and inclusion of a given stage will shift. Although the stages/tasks tabs appear across the top of the pages from Left to Right, the Facilitation Team may want to begin in the middle stage, "Integrate Ideas," and based on the ideas contributed, move to the far left stage, "Generate Ideas" or perhaps to "Assess Ideas."

The issue-exploration process continually gives the participants a "blank slate" to share whatever perspectives or knowledge they believe to be relevant and significant. Thus the process, to honor the diversity of ideas, needs to parallel the broad scope of possibilities and offer the Facilitation Team the opportunity to shape the exploratory process to take advantage and support the more promising ideas.

The majority of the ways that the shape of a project is informed by the content of the ideas contributed is indirect, through the interpretation and recommendations of the Facilitation Team. However, participants have a more direct way to reshape the project: at the bottom of each page of the participant's contributions, there is an option to make recommendations for innovation in the process by the participants (or to make innovation recommendations, in general, to the organization if the directions so stipulate), based on the participant's view of the content or his/her own unique perspective of what would be helpful to the group. The Facilitation Team reviews these recommendations ongoing and can take this direct input into their design considerations.

In addition, what may become clear to the Facilitation Team that there are two or more core threads that are emerging and would benefit from a more comprehensive exploration. The Facilitation Team has the power to create one or more NEW PROJECTS, each reflecting one of these promising threads. And again, new and existing participants may be invited to participate in these new projects, and the designing process of these new projects will follow on from the content of the ideas contributed.

Figure 12:
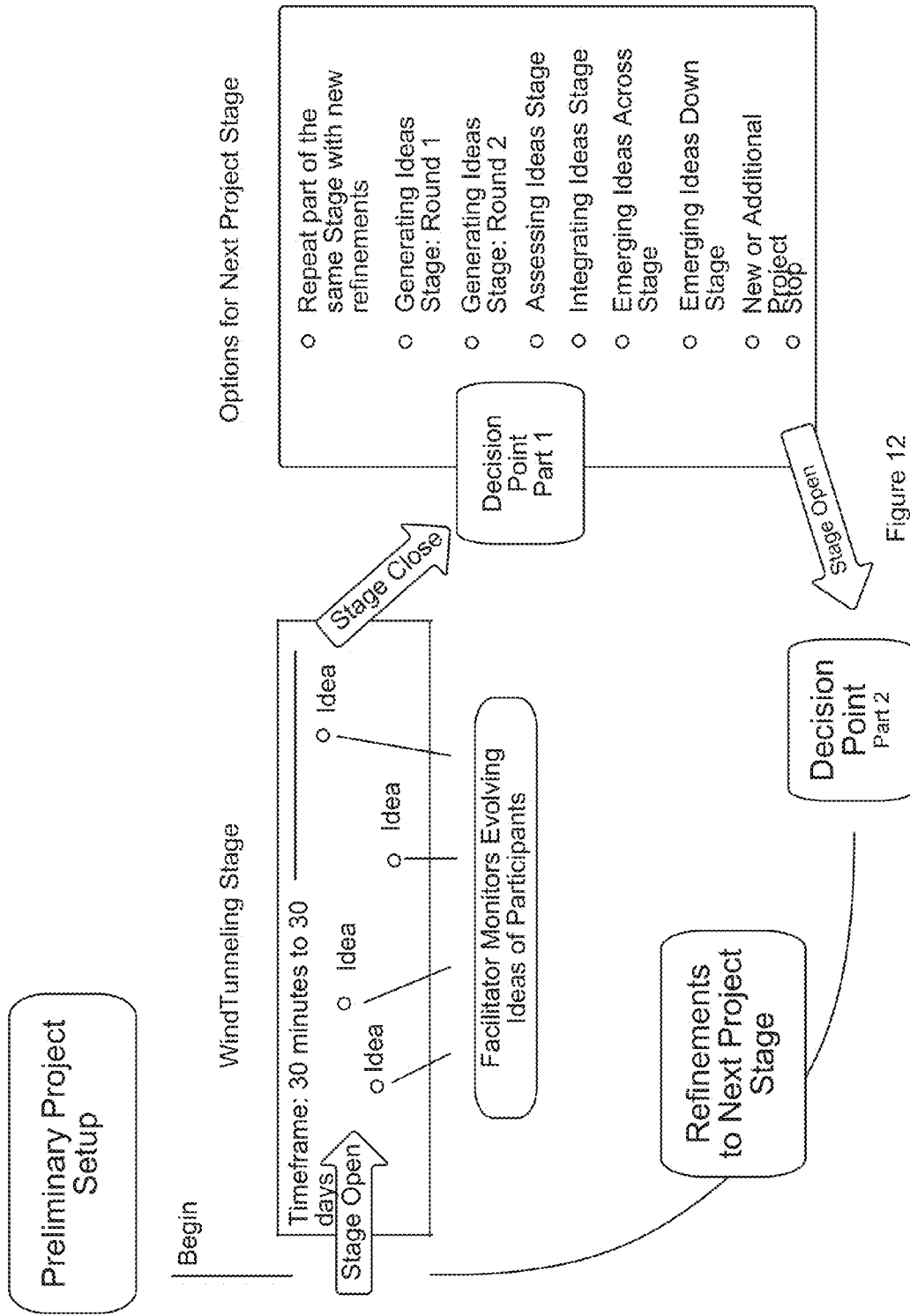
FIG. 12 illustrates an embodiment of the application coded to allow a facilitator monitoring the evolving ideas of participants to make decisions to refine the issue-exploration process.

FIG. 12 illustrates an embodiment of the application coded to allow a facilitator monitoring the evolving ideas of participants to make decisions to refine the issue-exploration process. The application allows repeating part of the same stage with new refinements. For example, the "Generating Ideas" stage may have multiple rounds and each round will have decision points on what refinements are to be made.

Figure 13:
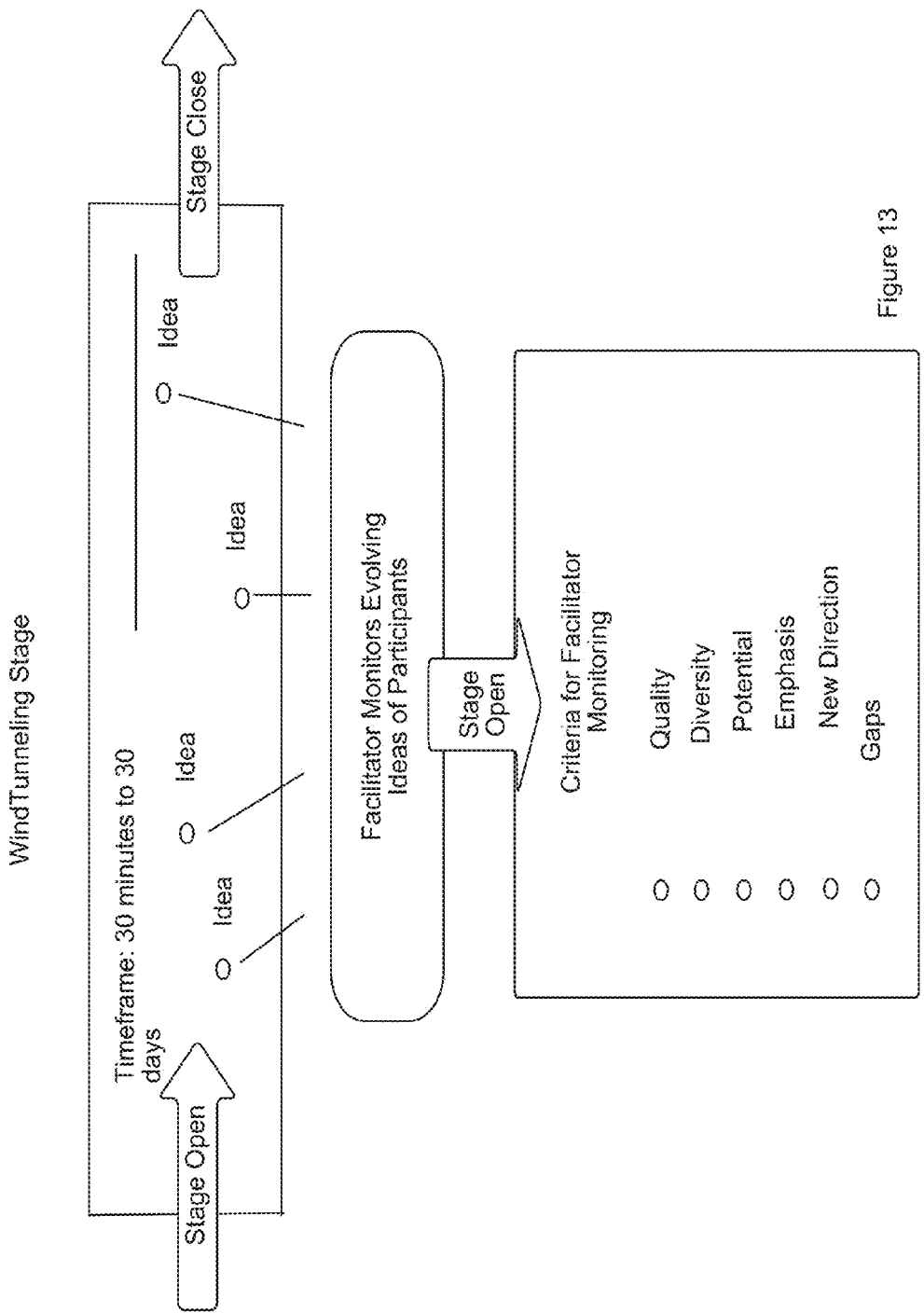
FIG. 13 illustrates an embodiment of the application coded to allow a facilitator monitoring the evolving ideas of participants and establishing criteria to refine the issue-exploration process.

FIG. 13 illustrates an embodiment of the application coded to allow a facilitator monitoring the evolving ideas of participants and establishing criteria to refine the issue-exploration process.

Figure 14:
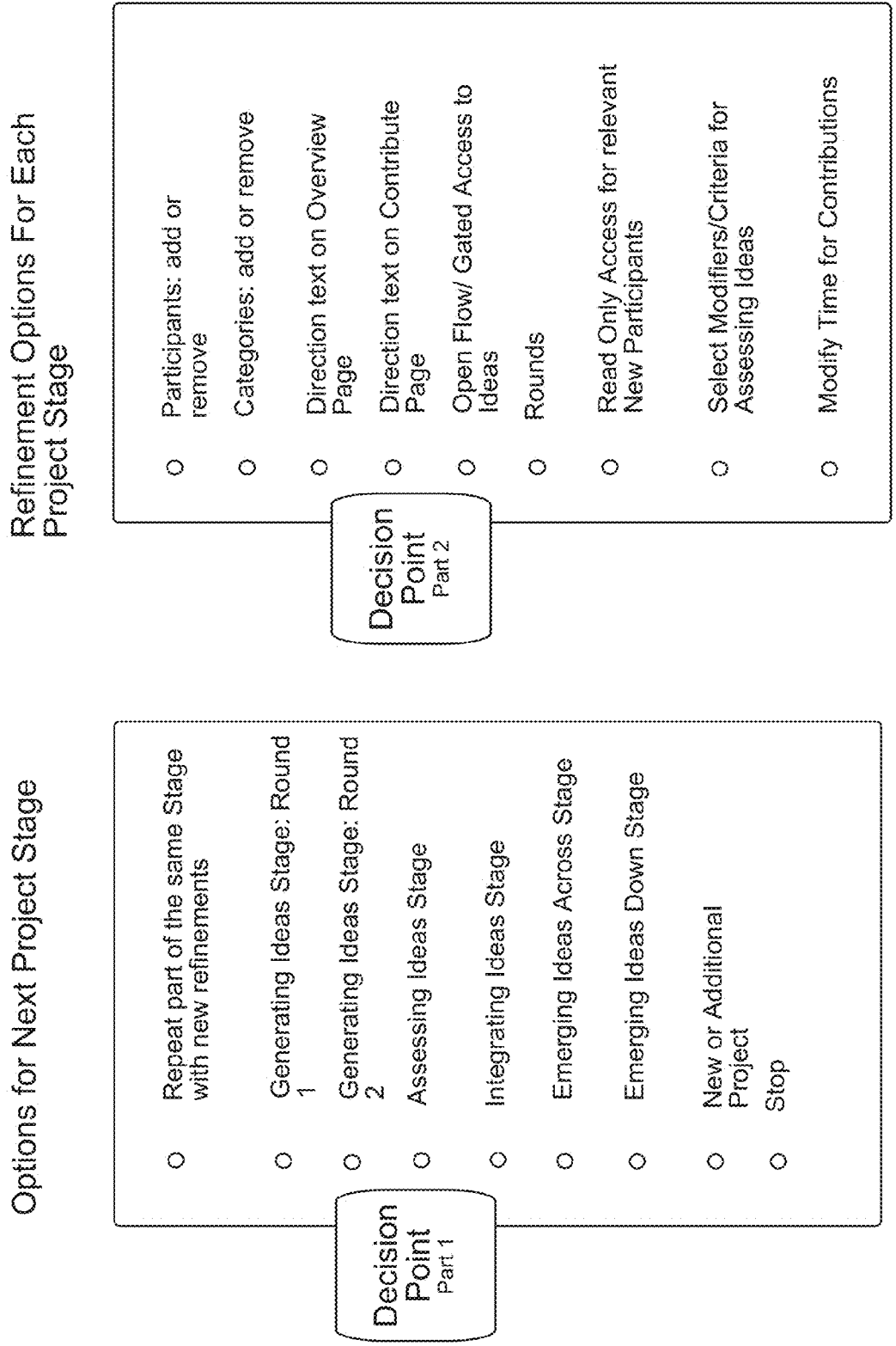
FIG. 14 illustrates an embodiment of the application coded to have various decision points on what refinements to make for the next project stage (choice and shape of the Stage) and the refinement options for each project stage.

FIG. 14 illustrates an embodiment of the application coded to have various decision points on what refinements to make for the next project stage and the refinement options for each project stage.

A refinement process within a given stage of the development process allows different categories of add and remove buttons on the user interface and allows the addition of new categories of ideas and the removal of older ideas that have less quality of influence on this discussion.

Refinement of idea categories occurs to shape the issue-exploration process in order to take into account the ideas contributed by the participants in the issue-exploration process and reshape during the actual idea development process. Categories might be set for a preliminary set of contributions, and then additional categories can be added during the process if/when the content of the contributions dictates that it would enhance the diversity/quality of the ideas that are generated.

Figure 15:
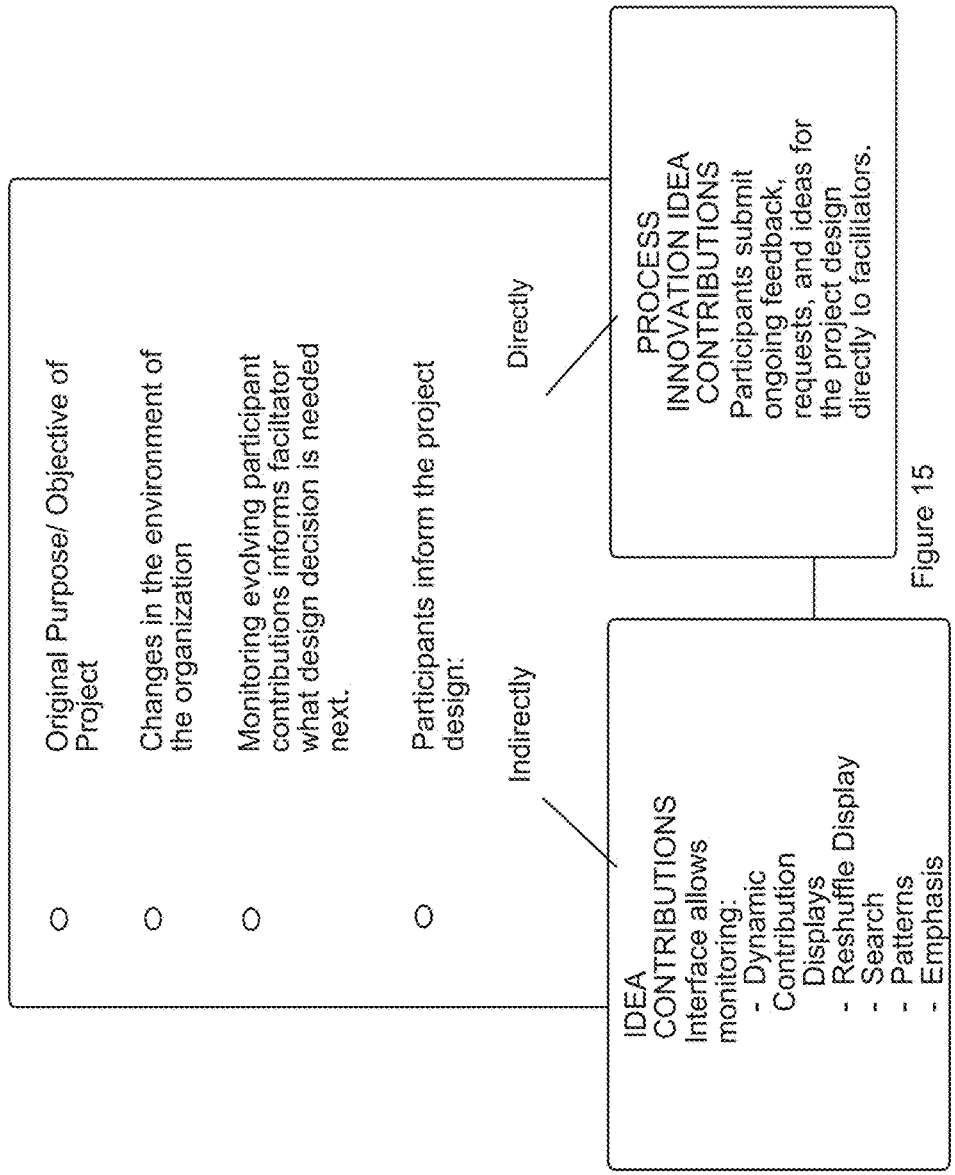
FIG. 15 illustrates an embodiment of a basis for project design decisions in the application.

FIG. 15 illustrates a basis for project design decisions in the application. The Facilitator monitoring of participants informs the project design in two ways. 1) Directly: The participants submit ongoing feedback, requests, and ideas for the project design directly to facilitators. 2) Indirectly The Facilitator and participants make inferences from idea contributions, patterns, Reshuffle Display, etc.

Referring back to FIG. 9, this figure shows aspects of the "Integrating Ideas" and "Emerging Insights" stages of the development process. The application allows assessment of ideas by populating a matrix with data/statistics/ideas, and then lets the participants rate the ideas based on modified criteria that was set. The participants and facilitator may then go to the "Generate Ideas" tab form and they can see in the data in a scatter gram. After one or two rounds, ideas can be brought into the Integrate Ideas Matrix for the group to consider, with statistics or other possible interesting ideas across the top for them to expand their thinking even further. Then, they can move into the emerge activities.

The new program allows the process to begin with "Integrate Ideas" and then into Emerge Insights Down/Across, and then to "Generate Ideas" based on the insights that emerge from the prior sections. The final two activities of EMERGING INSIGHTS DOWN and EMERGING INSIGHTS ACROSS build from the INTEGRATING IDEAS matrix. Insights may emerge from the prior stages. All of these design decisions are driven by the content of the ideas themselves, and the facilitation team is there to amplify and enhance the ideas that have the most "traction" as evidenced by the responses (qualitative) of the participants.

The Integrate Ideas Matrix lets us take any two sets of independent variables, and directly populate the "blue ideas" and "green ideas" rows/columns to create cells, where participants click on a cell and share their thinking on how the two ideas are related. The focus may be how each idea is related one other idea. Create an open idea matrix from the participants that shows the causal/nexus relationships that stem forth from the idea matrix. WT now has the capacity, in the "Integrate Ideas Matrix," to directly input whatever variables we want in the 10 spaces across and the 10 spaces down. For example, if we want to take 20 research articles on a topic that are current in journals around the world, we put 10 across and 10 down . . . and invite the participant from among the scientists in those projects, and their colleagues, to go into each cell and share what they see as the relationship of those two research findings. The interconnection of the research findings will throw up all kinds of new ideas about causation, relationships, new possibilities, etc. In the "Emerge Ideas," all of the ideas related to Blue Research #1 are printed out and cut up, and worked, potentially by inviting others, to consider how this might augment the next steps of their work. And so on for each of the 20 topics. Thus, once the participants have explored the cells, the Emerge Insights Across stage organizes the ideas in the blue idea row one. This lets the participants at the different sites where people are working go "off line" and "cluster and pattern" the post-it sized printed and cut up ideas for that row only. They then input their "insights" back into the application for all other participants to review and compare. The same process goes for the Emerge Insights Down stage, where each green idea column one on future scenarios is organized and printed, and people go off line. This opens a wealth of new possibilities, and it can be opened to the open source/crowd-sourcing group as the application allows auto-registration.

In addition, the Facilitation Team may set up twenty ideas to be assessed by an initial group of participants. At that point, depending on the ideas and the assessment to date (which can be in Open Flow or Gated), the Facilitation Team may then decide to add additional ideas to be assessed and invite the new participants to assess all of the ideas, and invite the original participants to assess the newly added ideas. Again, depending on the emphasis, shape, and thrust of the exploration of these ideas, the Facilitation Team has choices to modify the design to optimize the further development of emergent new ideas, insights, and valuable options for the organization and for each participant.

Based on the complexity and number of ideas to be assessed, the Facilitation Team can monitor participation through the Facilitator's program and participation date/time analytics to see how many participants have joined the stage. Thus, based on the participation levels, the dates for closing the stage might be extended to support the full review of the ideas by all participants.

The new program allows the process to begin with "Integrate Ideas" and then into "Emerge Insights" Down/Across, and then to "Generate Ideas" based on the insights that emerge from the prior sections. All of these design decisions are driven by the content of the ideas themselves, and the facilitation team is there to amplify and enhance the ideas that have the most "traction" as evidenced by the responses (qualitative) of the participants.

Integrate Ideas: Document Observations

What is the Facilitator Asked to do?

In selecting which Ideas will be used in the WindTunnel Testing Chamber, the Facilitation Team is once again asked by the application to choose among the Ideas generated by the Participants. This time the decisions will be made mostly on the basis of the data from the assessments.

Most of the Ideas chosen will be from the High Impact/High Probability quadrant of the graph from the application. One Event may be from the High Impact/Low Probability quadrant (Black Swans), and one or more with a very high standard deviation should also be considered. However, the primary consideration needs to be given to selecting a wide diversity of Future Events (i.e., a broad range of Categories). There will be 10 or fewer Events in the Testing Chamber, depending on the number of Strategies chosen. For a first WindTunneling project, we recommend 42 or fewer Future Frames total in the project matrix (6×7, 4×10, 8×5, etc.)

In the "Open" page of this Stage, you will input the Strategies that have been developed with the help of the Project Sponsors. Using the "Template for Strategies" is extremely helpful to assure shared understanding by the Participants of the What/How/Why of the Strategies (or approaches or intentions) being tested.

As the participants write their observations, the participants are asked by the application, "how the Strategy/Issue would perform, and why we think so." The "why we think so" part of the Observation is important for credibility, knowing what experience or knowledge the Participant holds that supports their Observation provides a context which helps the other Participants understand and work with that Observation more effectively. Make sure that the Participants know that if they have several different rationales for an Observation, they can enter the Observation again with a different rationale. This way no crucial insights are lost.

It is optimal to have all Participants enter Observations in all Frames, however, they may struggle with time. Keep an eye on how the Stage is going by checking the "Manage Outcomes" tab. The facilitator may be given a pop-up reminder by the application to remember to switch to "Open Flow," check the progress, and then switch back immediately to "Document Observations". The facilitator should try to sense into the time pressures and clear more time for them if competing work tasks are blocking their participation. If you think it is necessary, adjusting the calendar mid-stream is not a problem. Simply change the calendar and send out an email informing the participants. Midway through this Stage, you may also ask the Project Sponsors to send out an encouraging email if you think it is necessary.

When using the "Integrate Ideas" section of the application to manage a Coherence Mapping Process, the participants will be asked to document their observations about the intersection of Issues or Strategies, relative to the other Issues or Strategies: In this case, the same headings are in both the vertical and horizontal axis sections, and the coherence of pursuing both Issues or Strategies becomes the focus of Participant observations: If we pursue X Strategy, how coherent will be our response to Y Strategy? Where we invest in developing capacity for X Issue, how would that impact our ability to develop capacity for Y issue? Thus, very refined and sophisticated "critical thinking challenges" are posed for all participants, and they can respond freely without fear of appearing foolish or ignorant, as no one knows WHO said WHAT. In addition, the teamwork of the group is enhanced as participants realize that these ideas live in their group . . . and it does not matter WHOSE IDEA it was. A culture change to a more open, free-flowing and exploratory organization or system is supported by blocking ego attachment. A single participant fighting for that was MY idea is eliminated. Thus, the application becomes an even more powerful tool to engender, protect, and support culture change. Thus, the organization's capacity to manage complex issues is significantly enhanced.

If you have a few Participants who are struggling with this Stage, set up a "coaching session" with the application, via Skype, teleconference, or in person, to work through some examples with them. Remind them that they are to speak from their own experience, rather than to "guess at a right answer." No one can know a right answer until after the fact (should the event actually occur) and thus, we are all just trying to share our perspective from our life experience, knowledge, common sense, and perspective within the organization. It is precisely these multiple perspectives that build the effectiveness of WindTunneling Insights.

Select the "Ideas" for the "Matrix" in the Application

To choose your "Ideas" from the work of the Participants in this project, use the "Ideas Assessment Summary" below. Click the box in the "Select" column next to those Ideas you wish to choose. Once your selections are final, click on the box that says "Save Ideas Selections" at the bottom of this screen, and the "Ideas" you have chosen will automatically be posted in the "Idea Matrix" of the Participant's "Document Observations-Contribute" section.

Make sure that these Ideas are from diverse Categories, are easy to understand, and appear to pose a wide variety of changed conditions for the Strategies/Issues which are to be tested in the project. And again, try to limit the total Ideas multiplied by the number of Strategies to 42 or fewer.

If you are choosing to import a set of pre-developed "Ideas" located in a file accessible to the browser, you may do so with the "Import Ideas File" box below.

Emerge Insights Across

The participants generate and present via the application new Insights for enhancing the collective understanding and new ways forward for the organization's Strategies/Issues/Ideas, where the ideas are presented in the horizontal rows of the matrix. The Facilitation Team main task during this Stage will be to give the Participants support and guidance in their work via the application, regardless of whether the participant teams are meeting all together or in remote locations. You can do this either by having a group discussion and/or by referring them to the participant's help section in the software where they will find both an overview of approaches to the Stage. Additionally, the ability to provide a more detailed discussion on the Overview page exists in the application about the effective clustering, patterning, and development of emergent ideas. If they are struggling, you can do some examples together until they get the knack.

When the Participants are coming together to work on this Stage, the Facilitation Team will need to organize the group to split up into teams of from 2-4 people. Each group can view in the application a complete set of Observations for each of the Strategies/Issues, which were placed in the Testing Chamber matrix. The Observations are coded to aid you in doing this.

Depending on the number of Observations that were made, it can take from 30 minutes to an hour+ for a group to fully develop the Emergent Insights for a given Strategy/Issue. This includes crafting an effective and concise statement for each Insight, and the rationale for that Insight, and then entering this statement into the software program. Participants should understand that these Insights will be informing the decision-making in their organization, and that the clearer their ideas and their rationales, the more impact they are likely to have.

Scribing the "tentative" Insights on a vertical easel or white board presented in the application lets the group stand back and see each Insight as they decide how to communicate it most effectively. When the Insight has been fully developed, any member of the group can then submit the typed idea and title it into the pop-up window for "Submit an Insight."

Again, crafting an effective and concise statement of both the Insight and the rationale for the Insight insures that this Insight will be fully and correctly understood. Try to reinforce this idea at each opportunity.

When people are working remotely, strive to bring in people in those various locations to work with the participant to cluster, pattern, and develop emergent Insights for each Strategy/Issue/Idea.

Until the close date, individual participants may review the Observations and contribute additional Insights (along with their rationales) that will become part of the final outcomes. Additionally, any "Ideas for Innovation" can be added until the project closes.

Emerge Insights Down

The pattern for the work is the same as in the last Stage ("Emerging Insights Across") except that the Observations are organized by Ideas clustered in the vertical column rather than by the horizontal row. Participants will generate new Insights in the application about how to enhance the Strategy/Issue/Idea of the organization as a whole-Insights that will enable the leaders of the organization to anticipate and make decisions that can protect the organization/system.

The Facilitation Team's main task during this Stage will be to give the Participants support and guidance in their work, regardless of whether the participant teams are meeting all together or in remote locations. The application facilitates this either by having a group discussion and/or by referring them to the participant's software where they will find both an overview of approaches to the Stage as well as (in the "Help" section) a more detailed discussion about the effective clustering, patterning, and development of emergent ideas. If they are struggling, you can do some examples together until they get the knack.

If the participants are coming together to work on this Stage, the Facilitation Team will need to organize the group can be split up into teams of from 2-4 people. It also involves printing and cutting up enough sets of Observations so that each group has a complete set of Observations for each of the Future Events which were placed in the Testing Chamber Matrix. The Observations are coded to aid you in doing this.

The emergent Insights for any changed conditions suggested by any given Idea or set of Ideas includes crafting an effective and concise statement for each Insight, and the rationale for that Insight, and then entering this statement into the application on its user interface. Participants should understand that these Insights will be informing the decision-making in their organization, and that the clearer their ideas and their rationales, the more impact they are likely to have.

When the Insight has been fully developed, any member of the group can then type it into the pop-up window for "Submit an Insight for Insurance." Again, crafting an effective and concise statement of both the Insight and the rationale for the Insight insures that this Insight will be fully and correctly understood. Try to reinforce this idea at each opportunity.

Where people are working remotely, strive to bring in people in those various locations to work with the Participant to cluster, pattern, and develop emergent Insights for each set of Issues/Strategies/Ideas.

Until the close date, individual participants may review the Observations and contribute additional Insights (along with their rationales) that will become part of the final outcomes. Additionally, any "Ideas for Innovation" can be added until the project closes.

The Integrate Ideas Matrix lets us take any two sets of independent variables, and directly populate the "blue ideas" and "green ideas" rows/columns to create cells. The blue ideas rows may focused on organizational strategies, input research abstracts, etc. and the green ideas column may include "future scenarios" that were generated by participants, statistics or other government policies. The Emerging Insights across/down stages can be just one step of the issue-exploration-process or it can be a stand-alone research tool or methodology for global scientific advancement.

The application may have an auto-registration that allows the Integrate Ideas Stage to be used for a scientific/academic research function. The application allows pre-loading of abstracts from research papers in each of the blue and green cells. Next, the facilitator would open the project to a global population of researchers and students to share/read how others see that Green Idea 1 (i.e. an abstract on a particular type of gene splicing) and Blue Idea 1 (i.e. an abstract on a different splicing technique) are related. The facilitator may give guidance in the application to have a customized "ask" that asks people to identify recommendations for follow-on research or key individuals globally who are working in this area or both.

Note, use of the Integrate Ideas stage like the above example does not depend on the prior Generate/Assess stages.

Plan of Action

The plan of action could include recommendations, a list of identified problems to follow up on, a list of identified areas of exploration that have been identified as "high potential," a list of action items to be taken, etc.

The Evaluation Process can begin by sending an email or notification through the application with the PDF of the recommended "Reflections and Evaluation Form". Participants can open it, quickly give their feedback, and return it to the Facilitation Team. It is important for the Project Sponsors to be able to review the feedback from the participants, as well as from their own independent judgment about the value of the Insights generated by the project.

Each Insight from the participants and each "Idea for Innovation" needs to be explored by the Facilitation Team. Decisions need to be made about how to best present the Insights to the Project Sponsors, and this may be an iterative process. Other managers and leaders in the organization may also be interested, and they may have a particular need for Insights specifically related to a given Strategy or to a given Event. Participants in the project may have their own ideas about how to utilize the Insights and Observations to share with other members of the organization.

Figure 16:
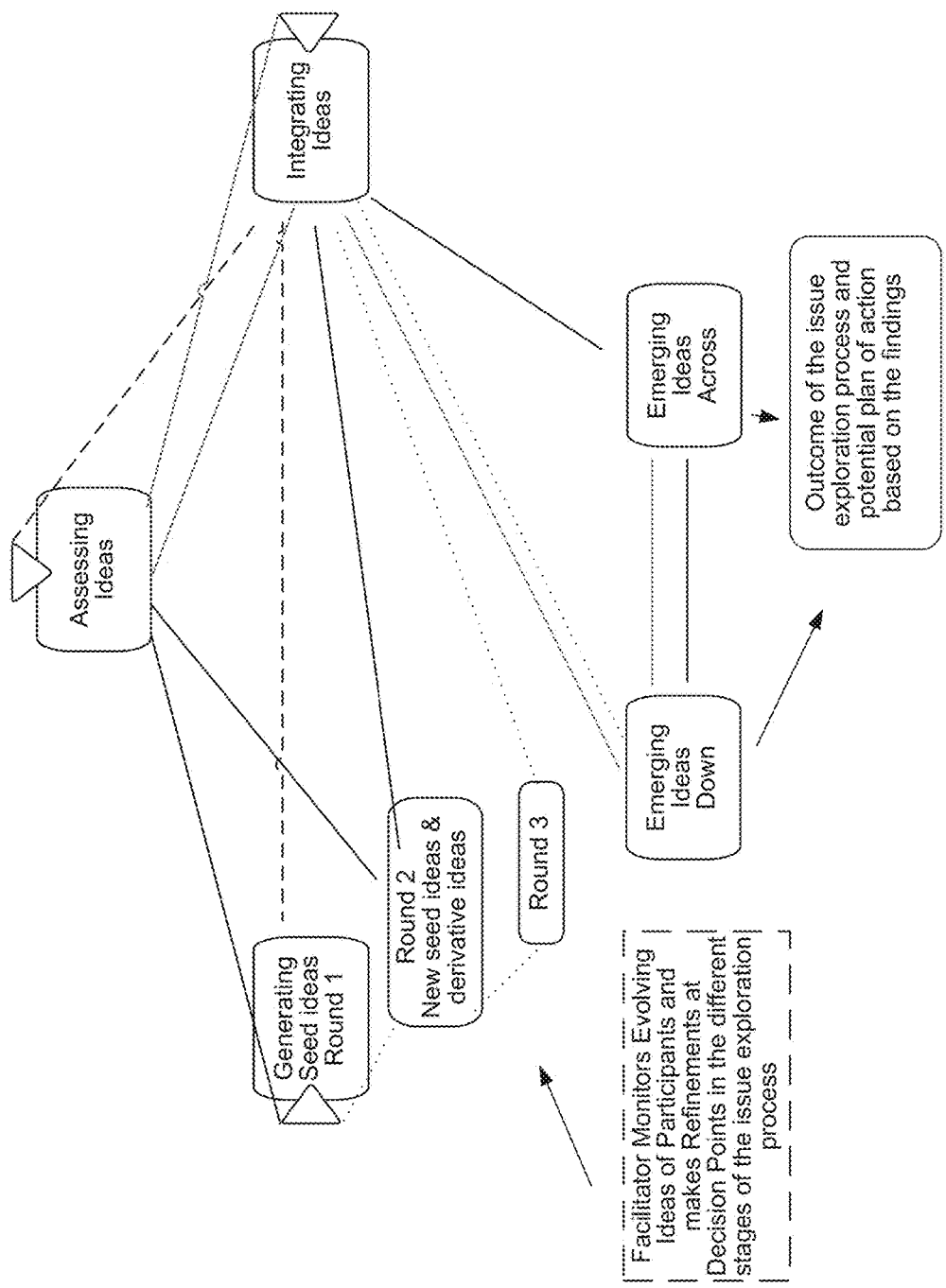
FIG. 16 shows an embodiment of an open framework of the application through the systematic structure of the series of tab forms and a combination of coding in the tab forms to facilitate iterative stage repeating, refinement options to modify parameters of a stage, and non-linear progression through a sequential order of stage progression in the issue-exploration process, which allows a facilitator to make significant changes in a direction of the issue-exploration process during the processes.

FIGS. 9 & 16 shows an open framework of the application through the systematic structure of the series of tab forms and a combination of coding in the tab forms to facilitate iterative stage repeating, refinement options to modify parameters of a stage, and non-linear progression through a sequential order of stage progression in the issue-exploration process, which allows a facilitator to make significant changes in a direction of the issue-exploration process during the processes. The issue-exploration process is not limited to keeping the parameters and fields initially set up for the issue-exploration process, where the changes in the direction of the issue-exploration process are more reflective of content from the ideas contributed by the participants and assessments of those ideas that are driving the direction of the issue-exploration process and then a different outcome is achieved from the issue-exploration process than initially mapped out by the facilitator.

The Open Architecture of the stages of development of the application allows these example changes to be made dynamically and be presented to the participants again with the specific design choices that the Facilitation Teams made, based on the content of the participants' original ideas.

The systematic stages of development framed in the user interface ("UI") allow the Facilitation Team to let the ideas be creatively nourished and developed by the participants, and then the Facilitation Team makes the appropriate refinement choices among the many unique variables that influence how a group of individuals can come together over time (1 hour to 1 month) to generate effective new and derivative ideas. The user interface allows additions/removal/and organizational functions to assist in the stages of development to be more reflective of the current direction the participants are driving the discussion on the original idea. Sometimes the ideas revealed in the refinement of choices and the iterative idea generation and assessment exploration need to be more divergent. Thus, the user interface is coded to allow the Facilitation Team to consider and make design parameters for the next step in the development process that can support this: For example, multiple ideas may need to be converged under a broader category and/or multiple ideas may need to become more specific. Thus, additions/removal/ and organizational functions can be made.

The participants advance and build on ideas that to them, show promise. The facilitator can then advance these high potential ideas into more development opportunities using additional activities of the overall process.

It is the combination of these various functions and stages that is crucial and makes this tool more flexible and more responsive to the quality of the ideas of the participants, including: refinement options within the rounds, altering an order of progression through the stages of issue development, including being able to go forward and backward, while being able to skip over other stages when progressing through the stages of issue development . . . etc.

The customization areas are not only the landing page for each stage, where the facilitation team outlines the big issue to be explored, but also, on each page where the participants contribute there are open spaces for the facilitation team to modify the directions based on the findings of the previous stage. This capacity to modify and customize did not exist previously.

The initial findings by anonymous participants are conveyed in the Generate Ideas stage, and then allowing additional Rounds to let people share additional related ideas or challenge ideas with new perspectives, the team helps all participants (and the leadership team) unearth the dysfunctions and identify new pathways that can work.

The content of the ideas redirects the shape of the process that the Facilitation Team creatively develops, and constantly adapts based on the ideas contributed.

Thus, WindTunneling enables and supports the Facilitation Team to set a preliminary opening issue, problem or opportunity in focus for a preliminary set of participants to consider.

Integrate Ideas, and based on the participation content and activity, modify the process to enhance the development of the ideas.

The systematic structure of the series of tab forms sets up the framework of the initial issue and a predicted outcome in the issue-exploration process, and when the coding allows a delicate balance between the systematic series of tab forms in the application and coded functionality in the series of tab forms to give a freedom to generate ideas by the participants, evaluate the ideas, emerge and evolve the ideas, and formulate a plan of action, then any decisions along the way in a progression through the issue-exploration process are based upon the knowledge and insights of the participants, where the collaborative group of participants can evolve the ideas into a final outcome, and then formulate the plan of action on the final outcome, which is significantly different than the original predicted outcome.

Through the series of tabs, the user interface presents a flexible, systematic, and in stages development process that evolves ideas and includes a potential plan of action based on the content/quality of the ideas contributed by the un-identified participants.

Opportunities for improvement, organizational learning, and new directions toward open communication and candor all come from creative design.

In an indirect way, participants' access to ideas being generated in activities taking place earlier in the project further enables the development of the project, as being informed by the content of the ideas contributed. Participants revisit earlier ideas, and the review stimulates new ideas that then become available for the Facilitation Team to consider in their upcoming design choices.

FIGS. 17 and 18 illustrate diagrams of an embodiment of the form-based Internet application, where the participants use one or more client machines. The client machines have i) browser software to access the form-based Internet application over a network, ii) a resident instance of the form-based Internet application on a first client machine configured to communicate either 1) with other instances of the form-based Internet application on the different client machines or 2) with a server based back end system over the network, and iii) any combination of both to allow the participants to be able to share and compare their knowledge and insights about a current issue in the issue-exploration process.

This form-based Internet application is a tool for cultural change because of its dynamic processes, its support for candor and building on the positive, and its egalitarian engagement coupled with transparency. The form-based Internet application is not limited to specific uses, i.e. future scenarios and strategies. Instead, all complex issues can be easily woven into the issue-exploration process, custom designed for the needs of the group.

Within a given tab, the iterative process of initially assessing the first set of ideas or information, and then looking at that first set of information by the participants and generating derivative ideas or new seed ideas from looking at the first process allows the participants to drive the focus of this discussion. Next, a refinement process within a given stage of the development process allows different categories of add and remove buttons on the user interface, the additions of new categories of ideas, and the removal of older ideas that have less quality of influence on this discussion.

The on-line web application allows many benefits visually, graphically, and interactively amongst collaborate groups of individuals. For example:

Leaders are under tremendous pressure. They want to be more effective, and some to be servant leaders, but they may not have the tools to know how. The on-line web application has an open architecture, capable of opening access to information that resides throughout the organization, but is currently not available given hierarchy and departments, gatekeepers, etc. This new functionality further enables leaders to experience how much latent knowledge and insight resides in their organization (without the personalities attached to the ideas) and how they can trust the group to make sense out of massive amounts of data and ideas. The open architecture allows facilitators to set up thinking challenges, based on independent sources of information, and use systemic methods/practices/principles to explore/develop new ideas out of the relationships that are positioned.

The application allows a logical analysis of an issue. However, the application also allows a more associative thinking and intuition to be invited into the exploration and planning processes. The application allows all ideas to be presented and evaluated so we avoid "rushing to judgment," assuming that we understand the variables and their relationships as we explore various complex issues.

In addition, the on-line web application allows approaching research from the perspective of enabling participants/users to make sense of the information; thus, usurping the traditional role of the research team leader. Rather than giving that power to outside experts, the on-line web application enables this power to be distributed throughout the participants/users; thus, tapping into their intellectual power and perspectives to optimize the collective intelligence.

This enables the on-line web application to be the Trojan horse getting into an organization and revealing to leaders and "supporters" that our current methodology of decision making is flawed when we are dealing with complex issues.

The on-line web application demonstrates that we are moving from leader/follower to a new paradigm of leaders/supporters. In the leader/supporter paradigm, the roles move up, down and sideways depending on the challenge before the team. Without the on-line web application, people continue to revert to conventional pathways of hierarchy because that is how the information flows, and then the narrowing process reinforces itself because those who have information have/hold power. The on-line web application changes and disrupts this hierarchy completely; and thereby, the better ideas are immediately self-evident and highly interesting.

FIG. 17 illustrates a block diagram of an example computing system, including a mobile computing device, that may use an embodiment of one or more of the software applications discussed herein. The computing system environment 800 is only one example of a suitable computing environment, such as a client device, and is not intended to suggest any limitation as to the scope of use or functionality of the design. Neither should the computing environment 800 be interpreted as having any dependency or requirement relating to any one or combination of components illustrated in the exemplary operating environment 800.

As discussed, the computing system may be a client mobile computing system. The system includes a processor, a memory, a built in battery to power the mobile computing device, a built-in video camera and display screen for the mobile computing device, and built-in Wi-Fi circuitry to wirelessly communicate with a server computer connected to network.

The design is operational with numerous other general purpose or special purpose computing system environments or configurations. Examples of well-known computing systems, environments, and/or configurations that may be suitable for use with the design include, but are not limited to: personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The design may be described in the general context of computing device executable instructions, such as program modules, being executed by a computer. Generally, program modules include routines, programs, objects, components, data structures, etc. that perform particular tasks or implement particular abstract data types. Those skilled in the art can implement the description and/or figures herein as computer-executable instructions, which can be embodied on any form of non-transitory computing machine readable media discussed herein.

The design may also be practiced in distributed computing environments where tasks are performed by remote processing devices that are linked through a communications network. In a distributed computing environment, program modules may be located in both local and remote computer storage media including memory storage devices.

With reference to FIG. 17, an exemplary computing type system for implementing the design includes a general-purpose computing device in the form of a computer 810. Components of computer 810 may include, but are not limited to: a processing unit 820 having one or more processing cores, a system memory 830, and a system bus 821 that couples various system components including the system memory to the processing unit 820. The system bus 821 may be any of several types of bus structures, including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) locale bus, and Peripheral Component Interconnect (PCI) bus.

Computer 810 typically includes a variety of computing machine-readable media. Computing machine-readable media can be any available media that can be accessed by computer 810, and includes both volatile and nonvolatile media, removable and non-removable media. By way of example, and not limitation, computing machine-readable medium uses include storage of information, such as computer readable instructions, data structures, program modules or other data. Computer storage mediums include, but are not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other tangible medium which can be used to store the desired information and which can be accessed by computer 800. Communication media typically embodies computer readable instructions, data structures, program modules, or other transport mechanisms and includes any information delivery media.

The system memory 830 includes computer storage media in the form of volatile and/or nonvolatile memory such as read only memory (ROM) 831 and random access memory (RAM) 832. A basic input/output system 833 (BIOS) containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 17 illustrates operating system 834, application programs 835, other program modules 836, and program data 837.

The computer 810 may also include other removable/non-removable volatile/nonvolatile computer storage media. By way of example only, FIG. 17 illustrates a hard disk drive 841 that reads from or writes to non-removable, nonvolatile magnetic media, a magnetic disk drive 851 that reads from or writes to a removable, nonvolatile magnetic disk 852, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, USB drives and devices, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and magnetic disk drive 851 and optical disk drive 855 are typically connected to the system bus 821 by a removable memory interface, such as interface 850.

The drives and their associated computer storage media discussed above and illustrated in FIG. 17, provide storage of computer readable instructions, data structures, program modules and other data for the computer 810. In FIG. 17, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A monitor 891 or other type of display screen is also connected to the system bus 821 via an interface, such as a video interface 890. In addition to the monitor, computers may also include other peripheral output devices such as speakers 897 and printer 896, which may be connected through an output peripheral interface 890.

The computer 810 may operate in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 17 include a local area network (LAN) 871 and a wide area network (WAN) 873, but may also include other networks. Such networking environments are commonplace in offices, enterprise-wide computer networks, intranets and the Internet. A browser application may be resident on the computing device and stored in the memory.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user-input interface 860, or other appropriate mechanism. In a networked environment, program modules depicted relative to the computer 810, or portions thereof, may be stored in the remote memory storage device. By way of example, and not limitation, FIG. 17 illustrates remote application programs 885 as residing on remote computer 880. It will be appreciated that the network connections shown are exemplary and other means of establishing a communications link between the computers may be used.

It should be noted that the present design can be carried out on a computing system such as that described with respect to FIG. 17. However, the present design can be carried out on a server, a computer devoted to message handling, or on a distributed system in which different portions of the present design are carried out on different parts of the distributed computing system.

Another device that may be coupled to bus 811 is a power supply such as a battery and Alternating Current adapter circuit. As discussed above, the DC power supply may be a battery, a fuel cell, or similar DC power source that needs to be recharged on a periodic basis. The wireless communication module 872 may employ a Wireless Application Protocol to establish a wireless communication channel. The wireless communication module 872 may implement a wireless networking standard such as Institute of Electrical and Electronics Engineers (IEEE) 802.11 standard, IEEE std. 802.11-1999, published by IEEE in 1999.

While other systems may use, in an independent manner, various components that may be used in the design, a comprehensive, integrated system that addresses the multiple advertising system points of vulnerability described herein does not exist. Examples of mobile computing devices may be a laptop computer, a cell phone, a personal digital assistant, or other similar device with on board processing power and wireless communications ability that is powered by a Direct Current (DC) power source that supplies DC voltage to the mobile device and that is solely within the mobile computing device and needs to be recharged on a periodic basis, such as a fuel cell or a battery.

Network Environment

FIG. 18 illustrates a diagram of a network environment in which the techniques described may be applied. The client machines have i) browser software to access the form-based Internet application over a network, ii) a resident instance of the form-based Internet application on a first client machine configured to communicate with 1) other instances of the form-based Internet application on the different client machines or 2) with a server based back end system over the network, and iii) any combination of both to allow the participants to be able to share and compare their knowledge and insights about a current issue in the issue-exploration process. The form-based Internet application consists of the user interface with its series of tab forms and a series of modules coded to present the complex issue on the one or more client machines such as lap top computers, smart phone, etc.

In an example, the network environment 200 has a network 202 that connects server-computing systems 204-1 through 204-n, and at least one or more client computing systems 200-1. As shown, there may be many server computing systems 204-1 through 204-n and many client computing systems 200-1 through 200-n connected to each other via a network 220, which may be, for example, the Internet. Note, that alternatively the network 220 might be or include one or more of: an optical network, the Internet, a Local Area Network (LAN), Wide Area Network (WAN), satellite link, fiber network, cable network, or a combination of these and/or others. It is to be further appreciated that the use of the terms "client computing system" and "server computing system" is for clarity in specifying who generally initiates a communication (the client computing system) and who responds (the server computing system). No hierarchy is implied unless explicitly stated. Both functions may be in a single communicating device, in which case the client-server and server-client relationship may be viewed as peer-to-peer. Thus, if two systems such as the client computing system 200-1 and the server computing system 204-1 can both initiate and respond to communications, their communication may be viewed as peer-to-peer. Likewise, communications between the client computing systems 204-1 and 204-2, and the server computing systems 200-1 and 200-2 may be viewed as peer-to-peer if each such communicating device is capable of initiation and response to communication. One or more of the server computing systems 204-1 to 204-n may be associated with a database such as, for example, the databases 206-1 to 206-n. A firewall such as, for example, the firewall may be established between a client computing system 200-3 and the network 220 to protect data integrity on the client computing system 200-3.

FIG. 18 also illustrates a block diagram of an embodiment of a server computing system to display information, such as a web page, etc. The form-based Internet application, when executed on the client machine, may communicate with a server computing system 204-1, causing the client computing system to display windows and user interface screens on a portion of a media space, such as a tab form. A user via an instance of the application resident on the client computing system may interact with the tab form, and then supply input to the query/fields and/or service presented by a user interface of the application.

Alternatively, the form-based Internet application, when executed on the server computing system 204-1, causes the server computing system 204-1 to display windows and user interface screens on a portion of a media space, such as a web page. A user via a browser from the client computing system 200-1 may interact with the web page, and then supply input to the query/fields and/or service presented by a user interface of the application. The web page may be served by a web server computing system 204-1 on any Hypertext Markup Language (HTML) or Wireless Access Protocol (WAP) enabled client computing system 200-1 or any equivalent thereof. For example, the client mobile computing system 200-1 may be a smart phone, a touch pad, a laptop, a notebook, etc. The client computing system 200-1 may host a browser to interact with the server computing system 204-1. Each application, widget, plug-in, etc. has a code scripted to perform the functions that the software component is coded to carry out such as presenting fields and icons to take details of desired information. Algorithms and engines within the server computing system 204-1 take the information from the presenting fields and icons and put that information into an appropriate storage medium such as a database. For example, the knowledge and insights contributed by the participants as well as any plan of action are stored in a database. The applications may be hosted on the server computing system 204-1 and served to the browser of the client computing system 200-1. The applications then serve pages that allow entry of details, and further pages that allow entry of more details.

Any application and other scripted code components may be stored on a computing machine-readable medium which, when executed on the machine, causes the machine to perform those functions. In an embodiment, the software used to facilitate the functions and processes described herein can be embodied onto a computing machine-readable medium such as computer readable medium. As discussed above, a computing machine-readable medium includes any mechanism that provides (e.g., stores) information in a form readable by a machine (e.g., a computer). For example, a computing machine readable medium includes read only memory (ROM); random access memory (RAM); magnetic disk storage media; optical storage media; flash memory devices; DVD's, EPROMs, EEPROMs, FLASH, magnetic or optical cards, or any type of media suitable for storing electronic instructions. The form-based Internet application may be implemented as software code, hardware logic circuits, and any combination of the two, and portions of the downloadable reminder application scripted in software code are stored in a non-transitory computing device readable medium in an executable format.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. These algorithms may be written in a number of different software programming languages such as C, C++, Java, or other similar languages. Also, an algorithm may be implemented with lines of code in software, configured logic gates in software, or a combination of both. In an embodiment, the logic consists of electronic circuits that follow the rules of Boolean Logic, software that contain patterns of instructions, or any combination of both.

It should be borne in mind, however, that all of these and similar terms are to be associated with the appropriate physical quantities and are merely convenient labels applied to these quantities. Unless specifically stated otherwise as apparent from the above discussions, it is appreciated that throughout the description, discussions utilizing terms such as "processing" or "computing" or "calculating" or "determining" or "displaying" or the like, refer to the action and processes of a computing system, or similar electronic computing device, that manipulates and transforms data represented as physical (electronic) quantities within the computing system's registers and memories into other data similarly represented as physical quantities within the computing system memories or registers, or other such information storage, transmission or display devices.

The present concept also relates to an apparatus for performing the operations herein. This apparatus may be specially constructed for the required purposes, or it may comprise a general purpose; computer selectively activated or reconfigured by a computer program stored in the computer.

Although embodiments of this invention have been fully described with reference to the accompanying drawings, it is to be noted that various changes and modifications will become apparent to those skilled in the art. Such changes and modifications are to be understood as being included within the scope of embodiments of this invention as defined by the appended claims. For example, several specific modules have been shown. Each module performs a few specific functions. However, all of these functions could be grouped into one module or even broken down further into scores of modules. Most functions performed by electronic hardware components may be duplicated by software emulation and vice versa. The invention is to be understood as not limited by the specific embodiments described herein, but only by scope of the appended claims.

While some specific embodiments of the invention have been shown, the invention is not to be limited to these embodiments. For example, Hardware logic may be used to implement the same functions as software coding and vice versa. The invention is to be understood as not limited by the specific embodiments described herein, but only by the scope of the appended claims.

What is claimed is:

1. An apparatus, comprising:
   a form-based Internet application that consists of
      a systematic structure of a series of tab forms to set up a framework for a collaborative effort from a group of participants on an issue-exploration process for an initial issue,
      where the group of participants use one or more client machines,
      where the series of tab forms are configured to allow the group of participants to anonymously perform stages of the issue-exploration process including generating ideas relevant to a current issue in a first tab form,
         assessing and assigning ratings to ideas regarding the current issue in a second tab form, including quantitatively assessing both an impact and a probability of the idea occurring,
         integrating the ideas amongst other ideas in a third tab form, and
         identifying any emerging insights from an integration of the ideas in at least a fourth tab form,
      where each tab form of the first, second, third, and fourth tab forms in the issue-exploration process is a different tab form presented in a user interface of the form-based internet application,
      where two or more of the series of tab forms have a series of menu options with pursuit-based functionality on the tab forms that can be performed under the tab forms to perform that pursuit,
      where the form-based Internet application is configured via the series of tab forms to enable and collect knowledge and said insights from the group of participants during the stages of the issue-exploration process,
      where the one or more client machines have
         i) browser software to access the form-based Internet application over a network,
         ii) a resident instance of the form-based Internet application on a first client machine configured to communicate
            1) with other instances of the form-based Internet application on other client machines of the one or more client machines or
            2) with a server-based back end system over the network, or
         iii) any combination of both i) and ii) to allow the group of participants to be able to share and compare their knowledge and said insights about a current issue in the issue-exploration process,
      where results collected from the knowledge and insights of the participants are then presented by the form-based Internet application on their client machine to all the participants,
      where the form-based Internet application has an open framework with the stages of the issue-exploration process in that an actual content of the ideas contributed by the group of participants actively shapes progression of the issue-exploration process from the initial issue to the current issue in the issue-exploration process, wherein the knowledge and insights contributed by the group of participants, as well as any plan of action are stored in a database, wherein the form-based Internet application is implemented as software code, hardware logic circuits, and any combination of the two, and portions of the form-based Internet application scripted in software code are stored in a non-transitory computing device readable medium in an executable format.

2. The apparatus of claim 1, where the series of tab forms are coded to facilitate an iterative process in different rounds of a same stage of the issue-exploration process, where one or more of the stages of the issue-exploration process can be repeated in a subsequent round of the same stage in the issue-exploration process based on reviewing the knowledge and insights contributed by the group of participants in an earlier round of that same stage, where a first instance of the first tab form is coded to collect the knowledge and insights contributed by the group of participants in an earlier round of a generating ideas stage to create a first set of seed ideas, and where a second instance of the first tab form is coded to collect the knowledge and insights contributed by the group of participants in a subsequent round of the generating ideas stage to generate derivative ideas and responsive ideas to the ideas in the earlier round after the group of participants assess ideas with numeric ratings from the participants the first set of seed ideas from the earlier round of the generating ideas stage.

3. The apparatus of claim 1, where the first tab form is coded to show the current issue being explored and has functionality on the first tab form for each participant to contribute their idea with a title and description, where the first tab form gives the group of participants a blank slate box to share whatever perspectives or said knowledge that they believe to be relevant and significant to the current issue being explored without presenting the group of participants a fixed list of options to provide their input on, and where the group of participants contribute their said idea with the title and its description into the corresponding blank slate boxes on the first tab form so that every contributed idea is documented in exact words supplied by the participant in the group and no restrictions constrain what said idea can be contributed.

4. The apparatus of claim 1, where the series of tab forms corresponding to the stages of the issue-exploration process are coded to have a non-linear order of progression through the stages of the issue-exploration process, including being able to migrate forward and backward through the stages while also being able to skip over other stages, by activating a desired tab form when progressing through the stages of the issue-exploration process that evolves said ideas into a potential plan of action.

5. The apparatus of claim 1, where the one or more of the tab forms corresponding to a given stage in the issue-exploration process are coded to include refinement option buttons to make changes in i) a next round of the given stage,
ii) in another stage of the issue-exploration process, or
iii) any combination of the two, in order to shape the issue-exploration process while the issue-exploration process is occurring, where the refinement option buttons are coded to be selected, and refinements are to be made based on a first pass review of the ideas generated by the group of participants after completing a first round of a generating ideas stage, and where a first set of the refinement option buttons on the user interface allow a facilitator to add, remove, or modify at least four of the following selected from i) categories of ideas,
ii) said group of participants participating in the issue-exploration process,
iii) the current issue being explored,
iv) creation of an additional round of reiterating a given stage of the issue-exploration process,
v) assigning read-only privileges to a participant of the group,
vi) selecting new criteria for assessing said ideas, and
vii) setting specific, unique directions to participants.

6. The apparatus of claim 1, where the series of tab forms displayed on the first client machine are coded to make an identity of a participant to remain anonymous from other participants and any management layer of the form-based internet application in order to separate a contributing participant's identity from an identity assigned to any given idea, and where all information generated by the participant on the first client machine is available to other participants on the other client machines.

7. The apparatus of claim 1, where an open framework of the form-based internet application, through a systematic structure of the series of tab forms and a combination of coding in the tab forms facilitates repeating one of the stages iteratively,
refinement options to modify parameters of a given stage, and
non-linear progression through a sequential order of stage progression in the issue-exploration process and allows a facilitator to make significant changes in a direction of the issue-exploration process while the processes is occurring, and the issue-exploration process is not limited to keeping the parameters and fields initially set up for the issue-exploration process, and where the significant changes in the direction of the issue-exploration process are more reflective of content from the ideas contributed by the group of participants, and assessments of those ideas drive the direction of the issue-exploration process to result in different achieved outcomes from the issue-exploration process than initially envisioned by the facilitator.

8. The apparatus of claim 1, where a systematic structure of the series of tab forms sets up the framework for the initial issue and a preliminary outcome in the issue-exploration process, where the application is coded to allow actual content of the ideas contributed by the group of participants to actively shape the progression of the issue-exploration process from the initial issue to the current issue in the issue-exploration process, where the ideas are contributed anonymously by the participants in the group, via a unique ID assigned to each contributed idea, so that a quality of the idea is separated from who contributed the idea, and the current issue in the issue-exploration process displayed on the first client machine is driven by the actual content from the ideas contributed by the group of participants and assessments of those ideas, and where a facilitator initially sets the initial issue and the preliminary outcome and then a different derivative discussion path on the current issue and a different outcome than initially mapped out occurs, based on the actual content from the ideas contributed by the participants in the group and the assessments of those ideas.

9. The apparatus of claim 1, where the systematic structure of the series of tab forms sets up the framework of the initial issue and a predicted outcome in the issue-exploration process, where the application is coded to balance the systematic structure of the series of tab forms in the form-based internet application and coded functionality in the series of tab forms to give a freedom to generate said ideas by the participants in the group, evaluate the ideas, emerge and evolve the ideas, and formulate a plan of action, where any decisions along the way in a progression through the issue-exploration process are based upon the knowledge and insights of the participants in the group, and where the group of participants can evolve the ideas into a final outcome, and then formulate the plan of action on the final outcome, which is significantly different than the predicted outcome.

10. The apparatus of claim 1, where the second tab form is coded to both
i) present a set of contributed ideas to be displayed on their client machine to all of the participants in the group and
ii) present a mechanism on their client machine for each participant to quantitatively assess both
the impact of the idea and
the probability of the idea occurring, for each of the contributed ideas in the set of the contributed ideas, where the application is coded to allow a facilitator to choose to include in the set of the contributed ideas presented on the second tab
i) all ideas contributed from the participants in the group in any of various rounds of a generating idea stage,
ii) a subset of the ideas from the various rounds of the generating idea stage,
iii) independent ideas to be assessed that come from other sources than the generating idea stage, or
iv) any combination of these three.

11. The apparatus of claim 1, where the series of tab forms are coded to present on their client machine when decisions are made by a facilitator, those decisions are transparent and presented on at least one of the tab forms to all the participants in the group, which protects against bias occurring in the issue-exploration process, and where also, the series of tab forms are coded to present any information that is generated by any one of the participants in the group is stored in the database and then is made available to all of the participants in the group by being presented on at least one of the tab forms to each said participant via their client machine.

12. A method for a collaborative effort from a group of participants on an issue-exploration process on one or more client machines, comprising:

configuring a form-based internet application that consists of a systematic structure of a series of tab forms to set up a framework for a collaborative effort from the group of participants on the issue-exploration process for an initial issue,
where the group of participants use two or more client machines, and
where each stage in the issue-exploration process is represented by a different tab form presented in a user interface of the form-based internet application;

configuring the series of tab forms to allow the group of participants to anonymously perform stages of the issue-exploration process including generating ideas relevant towards a current issue in a first tab form,
assessing and assigning ratings to the ideas regarding the current issue in a second tab form, including quantitatively assessing both an impact and a probability of the idea occurring,
integrating the ideas amongst other ideas in a third tab form, and
identifying any emerging insights from the integration of the ideas in at least a fourth tab form,
where two or more of the tab forms have a series of menu options with pursuit-based functionality on the tab forms that can be performed under the tab forms to perform that pursuit;

configuring the form-based Internet application via the series of tab forms to enable and collect knowledge and insights from the group of participants during the stages of the issue-exploration process,
where the two or more client machines have
i) browser software to access the form-based Internet application over a network,
ii) a resident instance of the form-based Internet application on a first client machine configured to communicate
1) with other instances of the form-based Internet application on other client machines of the one or more client machines or
2) with a server based back end system over the network, or
iii) any combination of both i) and ii) to allow the participants in the group to be able to share and compare their knowledge and insights about a current issue in the issue-exploration process;

configuring collecting results from the knowledge and insights of the participants, which are then presented by the form-based Internet application on their client machine to all the participants in the group,
where the form-based Internet application has an open framework with the stages of the issue-exploration process in that all information generated by any of the participants is available to all of the participants, thereby actively shaping progression of the issue-exploration process from a statement of the initial issue to the participants' understandings of emerging issues in the issue-exploration process; and configuring the knowledge and insights contributed by the group of participants as well as any plan of action to be stored in a database, wherein the form-based Internet application can be implemented as software code, hardware logic circuits, and any combination of the two, and portions of the form-based Internet application scripted in the software code are stored in a non-transitory computing device readable medium in an executable format.

13. The method of claim 12, further comprising:

configuring the series of tab forms to facilitate an iterative process in different rounds of a same stage of the issue-exploration process, where one or more of the stages of the issue-exploration process can be repeated in a subsequent round of the same stage in the issue-exploration process based on reviewing the knowledge and insights contributed by the group of participants in an earlier round of that same stage; and configuring collecting, in a first instance of the first tab form, the knowledge and insights contributed by the group of participants in an earlier round of a generating ideas stage to create a first set of seed ideas, and collecting, in a second instance of the first tab form, the knowledge and insights contributed by the group of participants in a subsequent round of the generating ideas stage to generate derivative ideas and new seed ideas after the participants assess the first set of seed ideas from the earlier round of the generating ideas stage.

14. The method of claim 13, further comprising:

configuring the second tab to both i) present a set of contributed ideas to be displayed on their client machine to all of the participants in the group and ii) present a mechanism on their client machine for each participant to quantitatively assess both
the impact of the idea and
the probability of the idea occurring, for each of the contributed ideas in the set of the contributed ideas; and allowing a facilitator to choose to include in the set of the contributed ideas presented on the second tab i) all ideas contributed from the group of participants in any of various rounds of the generating ideas stage, ii) a subset of the ideas from the various rounds of the generating ideas stage, iii) independent ideas to be assessed that come from other sources than the generating ideas stage, or iv) any combination of these three.

15. The method of claim 12, further comprising:

configuring the first tab form to show the current issue being explored and including functionality on the first tab form for each participant to contribute their idea with a title and description, where the first tab form gives the group of participants a "blank slate box" to share whatever perspectives or knowledge that they believe to be relevant and significant to the current issue being explored without presenting the group of participants a fixed list of options to provide their input on, and where the group of participants contribute their idea with the title and its description into the corresponding blank slate boxes on the first tab form so that every contributed idea is documented in the exact words supplied by the participant and no restrictions constrain what idea can be contributed.

16. The method of claim 15, further comprising:

configuring the first tab form and the second tab form to be displayed on the first client machine with an identity of a participant to remain anonymous from other participants and any management layer of the form-based Internet application in order to separate a contributing participant's identity from an identity assigned to any given idea.

17. The method of claim 12, further comprising:

configuring the series of tab forms corresponding to the stages of the issue-exploration process to have a non-linear order of progression through the stages of the issue-exploration process that generates more resilient options, promotes organizational coherence through shared learning, and reveals real-time organizationally-valuable insights, innovations, and patterns unique to that organization, reshaping its plan of action.

18. The method of claim 12, further comprising:

configuring the one or more of the tab forms corresponding to a given stage in the issue-exploration process to include refinement option buttons to make changes i) in a next round of the given stage, ii) in another stage of the issue-exploration process, or iii) any combination of the two, in order to shape the issue-exploration process while the issue-exploration process is occurring; and configuring the refinement option buttons to be selected and refinements are to be made based on a first pass review of the ideas generated by the group of participants after completing a first round of a generating ideas stage, where a first set of the refinement option buttons on the user interface allow a facilitator to add, remove, or modify at least four of the following selected from i) categories of ideas, ii) the group of participants participating in the issue-exploration process, iii) the current issue being explored, iv) creation of an additional round of reiterating a given stage of the issue-exploration process, v) assigning read-only privileges to a participant of the group, and vi) selecting new criteria for assessing the ideas.

19. The method of claim 18, further comprising:

configuring the systematic structure of the series of tab forms to set up the framework for the initial issue and a preliminary outcome in the issue-exploration process; and configuring the actual content of the ideas contributed by the group of participants to actively shape the progression of the issue-exploration process from the initial issue to the current issue in the issue-exploration process, where the ideas are contributed anonymously by the participants of the group, via a random unique ID assigned to each contributed idea, so that a quality of the idea is separated from who contributed the idea, and the current issue in the issue-exploration process displayed on the first client machine is driven by content from the ideas contributed by the group of participants and assessments of those ideas, and where a facilitator initially sets the initial issue and the preliminary outcome and then a different derivative discussion path on the current issue and different outcome than initially mapped out occurs based on the actual content from the ideas contributed by the group of participants and the assessments of those ideas.

20. The method of claim 12, further comprising:

configuring an open framework of the form-based internet application through the systematic structure of the series of tab forms and a combination of coding in the series of tab forms, in order to facilitate repeating one of the stages iteratively, refinement options to modify parameters of a given stage, and non-linear progression through a sequential order of stage progression in the issue-exploration process that allows a facilitator to make significant changes in a direction of the issue-exploration process during the processes, where the issue-exploration process is not limited to keeping the parameters and fields initially set up for the issue-exploration process, and where the significant changes in the direction of the issue-exploration process are more reflective of content from the ideas contributed by the participants and assessments of those ideas drive the direction of the issue-exploration process and then a different outcome is achieved from the issue-exploration process than initially mapped out by the facilitator.

* * * * *